United States Patent
Yamano et al.

(10) Patent No.: US 9,372,386 B2
(45) Date of Patent: Jun. 21, 2016

(54) PROJECTION SYSTEM, SUPPORT, AND IMAGE DISPLAY METHOD

(71) Applicant: Seiko Epson Corporation, Tokyo (JP)

(72) Inventors: Daigo Yamano, Azumino (JP); Hideki Takasuka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 239 days.

(21) Appl. No.: 13/856,762

(22) Filed: Apr. 4, 2013

(65) Prior Publication Data

US 2013/0265551 A1    Oct. 10, 2013

(30) Foreign Application Priority Data

Apr. 10, 2012   (JP) .................................. 2012089757
Apr. 10, 2012   (JP) .................................. 2012089758
Apr. 10, 2012   (JP) .................................. 2012089759

(51) Int. Cl.
| | |
|---|---|
| G03B 21/14 | (2006.01) |
| H04N 9/31 | (2006.01) |
| G03B 35/20 | (2006.01) |
| F16M 11/10 | (2006.01) |
| F16M 11/22 | (2006.01) |
| H04N 13/04 | (2006.01) |

(52) U.S. Cl.
CPC ............... *G03B 21/14* (2013.01); *F16M 11/10* (2013.01); *F16M 11/22* (2013.01); *G03B 21/145* (2013.01); *G03B 35/20* (2013.01); *H04N 9/3141* (2013.01); *H04N 9/3147* (2013.01); *H04N 9/3185* (2013.01); *H04N 13/0459* (2013.01); *G03B 21/147* (2013.01); *H04N 2213/001* (2013.01)

(58) Field of Classification Search
CPC ...... G03B 21/14; G03B 21/145; G03B 21/26; G03B 21/147; H04N 9/3147; H04N 9/3176; H04N 9/3188; H04N 9/3185
USPC .................... 353/119, 94, 7, 30, 122, 69, 70; 352/242, 243
See application file for complete search history.

(56) References Cited

U.S. PATENT DOCUMENTS

2005/0128437 A1 * 6/2005 Pingali et al. ................... 353/69
2009/0161028 A1   6/2009 Tanaka et al.

FOREIGN PATENT DOCUMENTS

| CN | 101466049 A | 6/2009 |
|---|---|---|
| CN | 201876619 U | 6/2011 |
| JP | 2000-137288 A | 5/2000 |
| JP | 2001-092002 A | 4/2001 |
| JP | 2005-128072 A | 5/2005 |
| JP | 2006-109168 A | 4/2006 |
| JP | 2011-33805 A | 2/2011 |
| JP | 2011-248238 A | 12/2011 |

* cited by examiner

*Primary Examiner* — William C Dowling
*Assistant Examiner* — Ryan Howard
(74) *Attorney, Agent, or Firm* — ALG Intellectual Property, LLC

(57) ABSTRACT

A projection system includes a first projector and a second projector. The projection system superimposes images projected from the first and second projectors on a projection surface and displays a projected image. The projection system includes a support configured to support the first projector and the second projector. The support supports the first projector and the second projector in positions where projection distances from the first projector and the second projector to the projection surface are different.

17 Claims, 22 Drawing Sheets

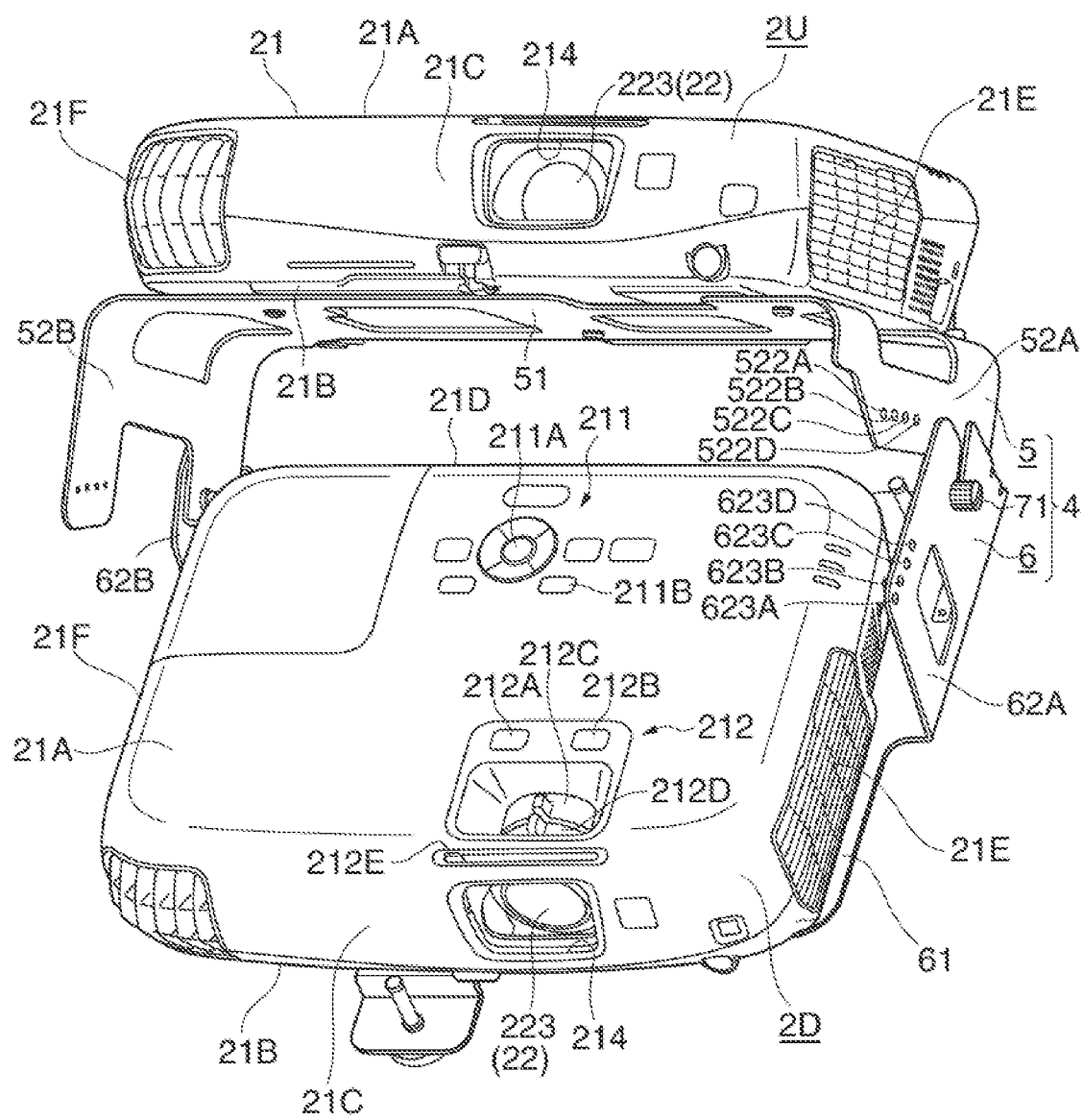
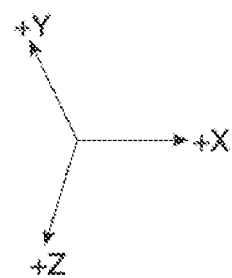
FIG. 5

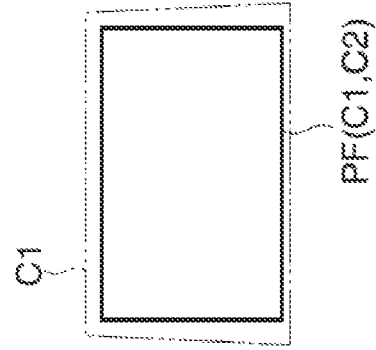
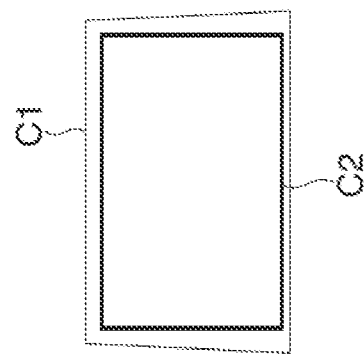
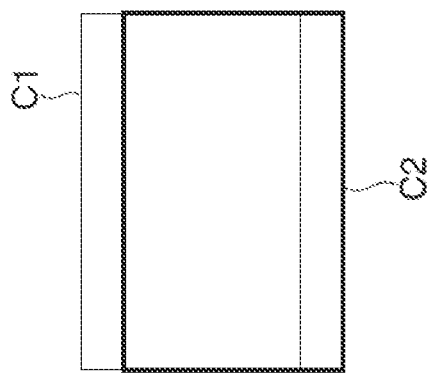

PROJECTION SYSTEM, SUPPORT, AND IMAGE DISPLAY METHOD

The entire disclosure of Japanese Patent Applications No. 2012-089757, No. 2012-089758, and No. 2012-089759, which are filed Apr. 10, 2012 are expressly incorporated by reference herein.

BACKGROUND

1. Technical Field

The present invention relates to a projection system, a support, and an image display method.

2. Related Art

There has been known a video display system (a projection system) in which a plurality of projectors are used (see, for example, JP-A-2011-33805 (Literature 1)).

The projection system described in Literature 1 adopts a stack projection system for superimposing images projected from the plurality of projectors on a projection surface such as a screen one on top of another to display a projected image on the projection surface.

Since such a stack projection system is adopted, compared with the use of only one projector, it is possible to display a projected image with improved brightness on the projection surface and display a projected image in which a stereoscopic image and two kinds of images can be observed.

In the stack projection system, as explained above, it is necessary to superimpose the images projected from the plurality of projectors on the projection surface one on top of another.

Therefore, when the projection system is built, a relative positional relation among the plurality of projectors is important.

For example, when two first and second projectors are used, it is necessary to change the postures of the first and second projectors as appropriate such that images projected from the first and second projectors overlap each other on the projection surface.

That is, work for changing the postures of the first and second projectors as appropriate is necessary. Therefore, it is difficult to build the projection system.

SUMMARY

An advantage of some aspects of the invention is to provide a projection system that can be easily built and a support and an image display method for easily building the projection system.

An aspect of the invention is directed to a projection system including a first projector and a second projector. The projection system superimposes images projected from the first and second projectors on a projection surface and displays a projected image. The projection system includes a support configured to support the first projector and the second projector. The support supports the first projector and the second projector in positions where projection distances from the first projector and the second projector to the projection surface are different.

In this aspect of the invention, the projection system includes the support.

Consequently, a user can easily specify a relative positional relation between the first and second projectors by causing the support to support the first and second projectors.

Therefore, when the projection system including the first and second projectors is built, if the support is used, it is possible to easily build the projection system.

When stack projection is performed using the first and second projectors, it is necessary to superimpose images projected from the first and second projectors on the projection surface one on top of the other (match the images). Therefore, it is necessary to calibrate the shape of the image projected on the projection surface from at least one of the first and second projectors (perform keystone distortion correction).

For example, the first and second projectors are assumed to be projectors of the same size. When the first and second projectors are arranged by the support in positions where projection distances of the first and second projectors are the same (a state in which positions in a projecting direction are the same), a problem explained below occurs.

In the following explanation, for convenience of explanation, it is assumed that an image (a second image) projected on the projection surface from the second projector is formed in a rectangular shape. An image (a first image) projected on the projection surface from the first projector is superimposed on the rectangular second image.

First, in the first projector, a posture in projecting the first image formed in a rectangular shape (an image of the same size as the second image) before being superimposed on the second image is referred to as first posture. A posture in changing a tilt from the first posture and projecting the first image that can be superimposed on the second image is referred to as second posture.

In the rectangular first image in the first posture, keystone distortion occurs in the second posture. However, the first image is subjected to keystone distortion correction to be calibrated into the rectangular shape.

In general, a projector is set to perform so-called tilting projection for projecting an image higher than a right-opposed position in normal placement setting on a floor, a desk, or the like.

When the first and second projectors set as explained above are arranged to be stacked and the first projector located above is tilted downward in order to superimpose images, the rectangular first image calibrated by being subjected to the keystone distortion correction as explained above is reduced in size compared with the first image projected on the projection surface in the first posture.

That is, the second projector needs to reduce the size of the second image according to the size of the first image reduced in size by the keystone distortion correction in the first projector. Therefore, the size of a projected image obtained by superimposing the first and second images is reduced.

In this aspect of the invention, the support supports the first and second projectors in positions where projection distances of the first and second projectors are different (a state in which positions in the projecting direction shift).

In the following explanation, for convenience of explanation, it is assumed that the projection distance of the first projector is set longer than the projection distance of the second projector.

That is, when the first projector is arranged in the first posture, the size of the rectangular first image projected on the projection surface is larger than the size of the second image. Similarly, when the first projector is arranged in the second posture, the size of the first image having a trapezoidal shape projected on the projection surface is also larger than the size of the second image.

Therefore, when the first image is superimposed on the rectangular second image as explained above, the size of the first image projected on the projection surface can be set large in advance. Therefore, if the first image is calibrated into the rectangular shape by the keystone distortion correction in the first projector, it is possible to superimpose the first and second images one on top of the other without reducing the size of the second image. That is, the size of a rectangular projected image obtained by superimposing the first and second images one on top of the other is not reduced.

In the projection system according to the aspect of the invention, it is preferable that the support supports the first projector and the second projector in positions where the first projector and the second projector are arranged along the thickness direction.

In this configuration, the support supports the first and second projectors as explained above.

Consequently, in the first and second projectors, it is possible to locate projection lenses, which project images, in positions close to each other.

In the following explanation, for convenience of explanation, as explained above, it is assumed that the second image projected on the projection surface from the second projector is formed in the rectangular shape. The first image is superimposed on the second image.

For example, when the projection lenses are located in positions spaced apart from each other, a projection angle of an image projected on the projection surface from the second projector and a projection angle of an image projected on the projection surface from the first projector are greatly different from each other.

That is, a distortion degree of the trapezoidal shape in the first image projected on the projection surface from the first projector is large when the projection lenses are located in the positions spaced apart from each other compared with when the projection lenses are located in the positions close to each other.

Therefore, by locating the projection lenses in the positions close to each other, it is possible to superimpose the first image on the second image while reducing a processing load in performing the keystone distortion correction.

By supporting the first and second projectors with the support as explained above, it is possible to compactly integrate the first and second projectors and the support as a unit.

In the projection system according to the aspect of the invention, it is preferable that the first projector is supported by the support in a position where the first projector covers a part of the top surface in the second projector, the second projector includes, on the top surface, an operation portion for operating the second projector, and the operation portion is provided in a region other than a region covered by the first projector on the top surface.

As the operation portion, a configuration explained below can be illustrated.

For example, as the operation portion, an operation panel including a power button and the like can be illustrated.

For example, as the operation portion, an operation button for enlarging or reducing an image on the projection surface and a zoom ring for adjusting a zoom position in the projection lenses can be illustrated.

Further, for example, as the operation portion, an operation button for focusing an image on the projection surface and a focus ring for adjusting a focus position in the projection lenses can be illustrated.

In the configuration described above, the operation portion is provided in the region other than the region covered by the first projector on the top surface of the second projector.

Consequently, even in a state in which the first and second projectors are supported by the support, it is possible to allow the user to operate the operation portion. Therefore, it is possible to secure operability of the second projector.

Another aspect of the invention is directed to an image display method used in a projection system including a first projector and a second projector supported by a support in positions where projection distances from the first projector and the second projector to a projection surface are different. The image display method includes superimposing an image projected from the first projector and an image projected from the second projector on the projection surface; and adjusting an image projected on the projection surface from one projector, the long projection distance of which is long, of the first projector and the second projector with reference to an image projected on the projection surface from the other projector, the projection distance of which is short.

In the aspect of the invention, the image display method is a method used in the projection system. Therefore, action and effect same as those of the projection system explained above can be obtained.

Still another aspect of the invention is directed to a support including: a first supporting member including a first fixing portion to which a first projector is fixed and a first connecting portion connected to the first fixing portion; a second supporting member including a second fixing portion to which a second projector is fixed and a second connecting portion connected to the second fixing portion; and an attachment screw including: a shaft portion, in the outer circumference of which a screw groove is formed, and a head portion provided on one end side of the shaft portion. The first connecting portion includes an attachment hole into which the attachment screw is screwed. The second connecting portion includes a slit extending from the outer edge toward the inner side and an insert hole provided to communicate with the slit and into which the attachment screw is inserted. The second connecting portion is held between the first connecting portion and the head portion through the insertion of the attachment screw into the insert hole and the attachment hole. The attachment screw including a taper portion provided between the shaft portion and the head portion, and having the cross-sectional area of which increases from the shaft portion toward the head portion.

In this aspect of the invention, the support includes the first and second supporting members and the attachment screw.

Consequently, if the first and second projectors are fixed to the first and second fixing portions and the first and second connecting portions are attached to each other by the attachment screw, it is possible to hold the second connecting portion between the head of the attachment screw and the first connecting portion and easily specify a relative positional relation between the first and second projectors.

Therefore, when the projection system including the first and second projectors is built, if the support is used, it is possible to easily build the projection system.

The insert hole and the slit are formed in the second connecting portion. The taper portion is provided in the attachment screw.

Consequently, in a state in which the first and second projectors are fixed to the first and second supporting members, it is possible to attach the first supporting member to the second supporting member as explained below.

First, the user screws the attachment screw into the attachment hole in a loosened state in advance (a first step).

Subsequently, the user holds the first supporting member (the first projector) by hand, brings the first supporting member closer to the second supporting member, and aligns the shaft portion of the attachment screw with a forming position of the slit at the outer edge of the second connecting portion (a second step).

The user moves, until the attachment hole opposes the insert hole, the first supporting member (the shaft portion) along the slit and locates the shaft portion in the insert hole (a third step).

The user can slide the taper portion on the inner edge of the insert hole and locate the attachment screw in a desired position in the insert hole (a position where the center position of the insert hole and the center line of the attachment screw coincide with each other) by tightening the attachment screw into the attachment hole. The second connecting portion is held between the first connecting portion, into which the shaft portion is screwed, and the head portion of the attachment screw (a fourth step). That is, the first supporting member is attached to the second supporting member.

According to the first to fourth steps, it is possible to attach the first supporting member to the second supporting member in a state in which the attachment screw is attached to the attachment hole in advance. Therefore, it is possible to easily assemble the support.

It is possible to locate the first supporting member in a desired position with respect to the second supporting member. It is possible to satisfactorily specify a relative positional relation between the first and second projectors.

In the support according to the aspect of the invention, it is preferable that the attachment screw includes a fitting portion provided between the taper portion and the head portion and fitting in the insert hole.

In this configuration, the attachment screw includes the fitting portion.

That is, it is possible to fit the fitting portion in the insert hole by further tightening the attachment screw into the attachment hole according to the fourth step.

The first supporting member is attached to the second supporting member in a state in which the fitting portion is fit in the insert hole. Therefore, the first supporting member does not wobble with respect to the second supporting member. It is possible to stabilize an attached state of the first supporting member to the second supporting member.

In the support according to the aspect of the invention, it is preferable that, when the insert hole and the slit are seen in plan view, the insert hole has a shape, a part of which protrudes to the outer side of an imaginary region formed by imaginarily extending the edge portion of the slit along a direction in which the slit extends.

In this configuration, when the insert hole and the slit are seen in plan view, the insert hole has the shape, a part of which protrudes to the outer side of the imaginary region.

Therefore, when the shaft portion is located in the insert hole in the third step, it is possible to regulate, with the portion protruding to the outer side of the imaginary region in the insert hole, the movement of the shaft portion (the first supporting member) from the insert hole into the slit.

Therefore, even in a state in which the second supporting member is set in various postures, it is possible to regulate the movement of the first supporting member if the attachment screw is once located in the insert hole in the third step. Therefore, the user does not need to apply force to maintain the state in which the attachment screw is located in the insert hole. That is, it is possible to more easily assemble the support.

In the support according to the aspect of the invention, it is preferable that the insert hole has a shape in which a tangential line of the insert hole coincides with any one of edge portions of the slit or an imaginary line formed by imaginarily extending the edge portion.

In the insert hole formed by a circular hole, as the shape of the part protruding to the outer side of the imaginary region when the insert hole and the slit are seen in plan view, for example, shapes explained below are conceivable.

As a first shape, a shape having portions respectively protruding to both sides across the imaginary region when the insert hole and the slit are viewed in plan view is conceivable.

As a second shape, a shape having a portion protruding to only one side of both the sides across the imaginary region when the insert hole and the slit are seen in plan view is conceivable.

The portion having a larger region of the two protruding portions in the insert hole having the first shape and the one protruding portion in the insert hole having the second shape are compared.

In this case, if inner diameter dimensions of the insert hole having the first shape and the insert hole having the second shape are the same, the region of the protruding portion is larger in the insert hole having the second shape.

In the configuration described above, the insert hole formed by the circular hole is formed such that a tangential line of the insert hole seen in plan view coincides with any one of the edge portions of the slit or an imaginary line formed by imaginarily extending the edge portion. In other words, the insert hole has the second shape.

Consequently, in the insert hole formed to have the second shape, the region of the protruding portion can be set large compared with when the insert hole is formed to have the first shape.

Therefore, when the shaft portion is located in the insert hole in the third step, it is possible to surely regulate, with the protruding portion in the insert hole, the movement of the shaft portion (the first supporting member) from the insert hole into the slit.

In the support according to the aspect of the invention, it is preferable that the first connecting portion and the second connecting portion are formed to extend along the vertical direction, the slit has a shape inclining to the downward side from the outer edge of the second connecting portion in a posture in which the top surfaces of the first projector and the second projector respectively fixed to the first fixing portion and the second fixing portion are located on the upward side with respect to the bottom surfaces of the first projector and the second projector, and the insert hole has a shape protruding to the upward side of the imaginary region in the posture.

When the projection system is built, it is conceivable that the support to which the first and second projectors are fixed is set on a floor or the like (hereinafter, normal placement setting) and that the support is set to be suspended from a ceiling or the like (hereinafter, ceiling suspension setting).

In the case of the normal placement setting, the first and second projectors fixed to the support take a posture in which the top surfaces are located on the upward side with respect to the bottom surfaces.

On the other hand, in the case of the ceiling suspension setting, opposite to the normal placement setting, the first and second projectors fixed to the support take a posture in which the top surfaces are located on the downward side with respect to the bottom surfaces.

In the configuration described above, in the case of the normal placement setting, the slit has a shape inclining to the downward side from the outer edge of the second connecting portion toward a position opposed to the attachment hole.

Therefore, in the case of the normal placement setting, the steps 2 and 3 can be carried out as explained below.

In the second step, the user holds the first supporting member (the first projector) by hand and brings the first supporting member closer to the second supporting member from the upward side of the second supporting member (the second projector) set on the floor or the like. The user aligns the shaft portion of the attachment screw with the forming position of the slit at the outer edge of the second connecting portion.

In the third step, the user moves, until the attachment hole opposes the insert hole, the first supporting member (the shaft portion) from the upward side to the downward side along an inclining direction of the slit and locates the shaft portion in the insert hole.

When the shaft portion is located in the insert hole in the third step, the slit inclines to the downward side from the outer edge of the second connecting portion toward the position opposed to the attachment hole. Therefore, it is possible to regulate, with the own weight of the first supporting member and the projector, the movement of the shaft portion (the first supporting member) from the insert hole into the slit.

On the other hand, in the case of the ceiling suspension setting, the second and third steps can be carried out as explained below.

In the second step, the user holds the first supporting member (the first projector) by hand and brings the first supporting member closer to the second supporting member from the downward side of the second supporting member (the second projector) suspended from the ceiling. The user aligns the shaft portion of the attachment screw with the forming position of the slit at the outer edge of the second connecting portion.

In the third step, the user moves, until the attachment hole opposes the insert hole, the first supporting member (the shaft portion) from the downward side to the upward side along the inclining direction of the slit and locates the shaft portion in the insert hole.

The insert hole has a shape protruding to the upward side of the imaginary region in the normal placement setting. That is, the insert hole has a shape protruding to the downward sided of the imaginary region in the ceiling suspension setting. Therefore, when the shaft portion is located in the insert hole, it is possible to regulate, with the own weight of the first supporting member and the projector, the movement of the shaft portion (the first supporting member) from the insert hole into the slit.

As explained above, by setting the inclining direction of the slit and the insert hole as explained above, in both of the normal placement setting and the ceiling suspension setting, it is possible to easily incorporate the first supporting member in the second supporting member (the third step) and satisfactorily regulate the movement of the shaft portion (the first supporting member) from the insert hole into the slit.

Yet another aspect of the invention is directed to a support including: a first supporting member to which a first projector is fixed; a second supporting member to which a second projector is fixed; and a moving mechanism configured to connect the first supporting member and the second supporting member and relatively move the first supporting member and the second supporting member. The moving mechanism locates the first projector in a first position where the first projector covers at least apart of the top surface of the second projector or a second position where the first projector uncovers the top surface of the second projector.

In this aspect of the invention, the support includes the first and second supporting members and the moving mechanism.

Consequently, the user fixes the first and second projectors to the first and second supporting members and relatively moves the first and second supporting members with the moving mechanism. By moving the first and second supporting members in this way, it is possible to locate the first projector in the position (the first position) where the first projector covers at least a part of the top surface of the second projector (the upper surface of the second projector set on the floor or the like).

When the first and second projectors are fixed to the first and second supporting member, projection sides of images from the first and second projectors are set be located on the same side when the first projector is located in the first position.

If the projection sides are set in this way, it is possible to perform stack projection by causing the first and second projectors to operate in a state in which the first projector is located in the first position.

That is, it is possible to easily regulate a relative positional relation between the first and second projectors simply by fixing the first and second projectors to the first and second supporting members and locating the first projector in the first position with the moving mechanism.

Therefore, when the projection system including the first and second projectors is built, if the support is used, it is possible to easily build the projection system.

A configuration explained below is often used in a projector.

An operation panel including a power button for turning on and off a power supply for the projector is provided on the top surface of the projector (an armor housing).

A lamp lid is attached to the top surface of the projector to be detachably attachable to the armor housing in order to replace a light source lamp on the inside.

When the configuration explained above is taken into account, it is necessary to dispose the first and second projectors as explained below when the projection system is built.

That is, when operability is taken into account, it is necessary to dispose the first and second projectors spaced apart from each other to allow the user to operate operation panels provided on the top surfaces of the first and second projectors.

When maintainability is taken into account, similarly, it is necessary to dispose the first and second projectors spaced apart from each other to allow the user to attach and detach lamp lids provided on the top surfaces of the first and second projectors.

In the aspect of the invention, by relatively moving the first and second supporting members with the moving mechanism, it is possible to locate the first projector in the first position and locate the first projector in the position (the second position) where the first projector is spaced apart from the top surface of the second projector and uncovers the top surface.

That is, when the stack projection is performed, the first projector is located in the first position. When the stack projection is not performed, the first projector is located in the second position.

By locating the first projector in the second position when the stack projection is not performed, since the top surface of the second projector is uncovered, it is possible to allow the user to operate the operation panel provided on the top surface of the second projector. It is possible to allow the user to attach and detach the lamp lid provided on the top surface of the second projector.

Concerning the top surface of the first projector, the uncovered state is maintained. Therefore, it is possible to allow the user to operate the operation panel and attach and detach the lamp lid in the first projector in both of the state in which the first projector is located in the first position and the state in which the first projector is located in the second position.

The first projector is located in the second position as explained above, whereby operability and maintainability of the second projector are secured. Therefore, when the stack projection is performed (when the first projector is located in the first position), it is possible to set the first and second projectors in an adjacent state.

That is, when the stack projection is performed, it is possible to compactly integrate the first and second projectors and the support as a unit.

In the support according to the aspect of the invention, it is preferable that the moving mechanism relatively rotates the first supporting member and the second supporting member around a predetermined rotation axis and locates the first projector in the first position or the second position and the rotation axis is orthogonal to a direction extending along the projecting direction of an image by the first projector or the second projector and a direction extending along the thickness direction of the first projector or the second projector.

In this configuration, the moving mechanism relatively rotates the first and second supporting members about the rotation axis orthogonal to the direction extending along the projecting direction of an image from the first projector or the second projector and the direction extending along the thickness direction (a direction from the top surface to the bottom surface) of the first projector or the second projector.

Consequently, by relatively rotating the first and second supporting members with the moving mechanism, for example, it is possible to adjust the position (a projecting position) of an image projected on the screen from the first projector and superimpose the image on an image projected on the screen from the second projector.

Therefore, it is possible to adjust a projecting position and realize improvement of convenience while securing operability and maintainability of the first and second projectors with the moving mechanism.

In the support according to the aspect of the invention, it is preferable that the rotation axis is provided on aside in the opposite direction of the projecting direction with respect to the first projector or the second projector.

When the rotation axis is provided further on the front surface side than the position of the rear surface (a surface opposed to the front surface on aside on which an image is projected) of the first projector or the second projector, a problem explained below occurs.

When the first and second supporting members are relatively rotated, in order to prevent mechanical interference of the first and second projectors, it is necessary to set the first and second projectors in a separated state from each other in the state in which the first projector is located in the first position.

In the configuration described above, the rotation axis is provided on the side in the opposite direction of the projecting direction with respect to the first projector or the second projector.

Consequently, when the stack projection is performed (when the first projector is located in the first position), it is possible to set the first and second projectors in an adjacent state.

That is, even if the first and second projectors are set in the adjacent state as explained above, it is possible to relatively rotate the first and second supporting members and locate the first projector in the second position while preventing mechanical interference of the first and second projectors.

Therefore, when the stack projection is performed, it is possible to compactly integrate the first and second projectors and the support as a unit.

In the support according to the aspect of the invention, it is preferable that the support includes a rotation suppressing mechanism configured to suppress relative rotation of the first supporting member and the second supporting member, the rotation suppressing mechanism includes an urging member, and the first projector is located in the second position by an urging force of the urging member.

When the projection system is built, it is conceivable that the support to which the first and second projectors are fixed is set on a floor or the like (hereinafter, normal placement setting) and that the support is suspended from a ceiling or the like and set (hereinafter, ceiling suspension setting).

In the case of the normal placement setting, the first and second projectors fixed to the support take a posture in which the top surfaces are located on the upward side with respect to the bottom surfaces in the state in which the first projector is located in the first position.

On the other hand, in the case of the ceiling suspension setting, contrary to the case of the normal placement setting, the first and second projectors fixed to the support take a posture in which the top surfaces are located on the downward side with respect to the floor surface in a state in which the first projector is located in the first position.

That is, in the case of the ceiling suspension setting, the first projector (the first supporting member) is located on the downward side with respect to the second projector (the second supporting member suspended from the ceiling or the like). Therefore, when the first projector is located in the second position, the state in which the first projector is located in the second position is maintained by the own weight of the first projector and the first supporting member.

On the other hand, in the case of the normal placement setting, the first projector (the first supporting member) is located on the upward side with respect to the second projector (the second supporting member set on the floor or the like). Therefore, when the first projector is located in the second position, it is likely that the first supporting member rotates with respect to the second supporting member with the own weight of the first projector and the first supporting member in a direction in which the first projector returns to the first position.

In the configuration described above, the support includes the rotation suppressing mechanism including the urging member configured to maintain the position (the second position) of the first projector with the urging force.

Consequently, in the case of the normal placement setting, it is possible to prevent the first supporting member from rotating with respect to the second supporting member with the own weight of the first projector and the first supporting member in the direction in which the first projector returns to the first position. In the ceiling suspension setting, it is possible to maintain the first projector in a stable state.

Therefore, in the cases of the normal placement setting and the ceiling suspension setting, it is possible to allow the user to satisfactorily operate the operation panel and attach and detach the lamp lid in the second projector in the state in which the first projector is located in the second position.

In the support according to the aspect of the invention, it is preferable that the rotation suppressing mechanism includes a contact portion configured to contact with the urging member according to relative rotation of the first supporting member and the second supporting member, the urging member is provided in one of the first supporting member and the second supporting member, the contact portion is provided in the other of the first supporting member and the second supporting member, and the contact portion has a shape in which, a distance between the rotation axis and a position where the contact portion and the urging member are in contact increases according to the relative rotation from the first position to the second position.

In the case of the ceiling suspension setting, as explained above, the first projector (the first supporting member) is located on the downward direction with respect to the second projector (the second supporting member suspended from the ceiling or the like). Therefore, when the first projector is located in the second position from the first position, it is likely that the first supporting member suddenly rotates with respect to the second supporting member with the own weight of the first projector and the first supporting member.

In the configuration described above, the support includes the rotation suppressing mechanism including the urging member and the contact portion.

In the contact portion, the distance between the rotation axis and the contact position where the contact portion is in contact with the urging member is set as explained above.

Consequently, as the first supporting member rotates with respect to the second supporting member from the state in which the first projector is located in the first position to the state in which the first projector is located in the second position, a pressing force from the contact portion to the urging member increases.

In other words, as the first member rotates as explained above, a fiction force between the contact portion and the urging member increases.

That is, the rotation suppressing mechanism functions as a brake mechanism for the first supporting member that rotates as explained above.

Therefore, in the case of the ceiling suspension setting, when the first projector is located in the second position from the first position, it is possible to suppress the first supporting member from suddenly rotating with respect to the second supporting member.

Still yet another aspect of the invention is directed to a projection system including a first projector, a second projector, and the support.

In this aspect of the invention, since the projection system includes the support, action and effect same as those of the support explained above can be obtained.

BRIEF DESCRIPTION OF THE DRAWINGS

The invention will be described with reference to the accompanying drawings, wherein like numbers reference like elements.

FIG. 5 is a diagram showing the configuration of the support in the embodiment of the invention.

FIG. 9A is a diagram for explaining an effect in the embodiment of the invention.

FIG. 9B is a diagram for explaining the effect in the embodiment of the invention.

FIG. 9C is a diagram for explaining the effect in the embodiment of the invention.

DESCRIPTION OF EXEMPLARY EMBODIMENTS

Embodiments of the invention are explained below with reference to the accompanying drawings.

The invention is not limited to the embodiments explained below.

First Embodiment

Configuration of a Projection System

Figure 1:
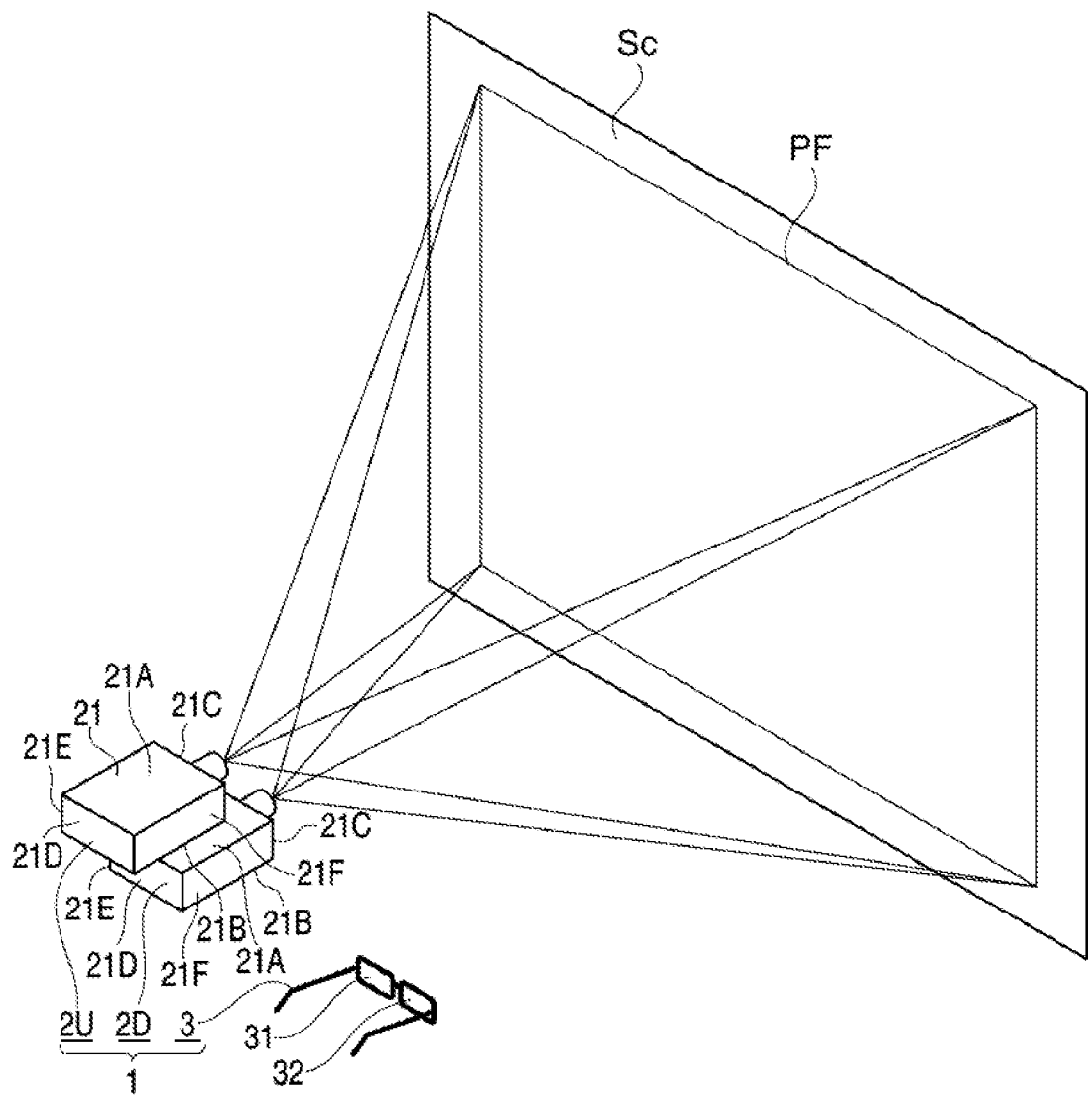
FIG. 1 is a perspective view showing a mode of use of a projection system in an embodiment of the invention.

FIG. 1 is a perspective view showing a mode of use of a projection system 1 in a first embodiment.

In this embodiment, the projection system 1 is configured by a 3D projection system that displays, with stack projection, a projected image PF (FIG. 1) on a reflective screen (projection surface) Sc (FIG. 1) and allows an observer to stereoscopically view the projected image PF.

The projection system 1 includes, as shown in FIG. 1, a first projector 2U, a second projector 2D, polarized glasses 3, and a support 4 (see FIGS. 3 to 6).

Configuration of the First and Second Projectors

Figure 2:
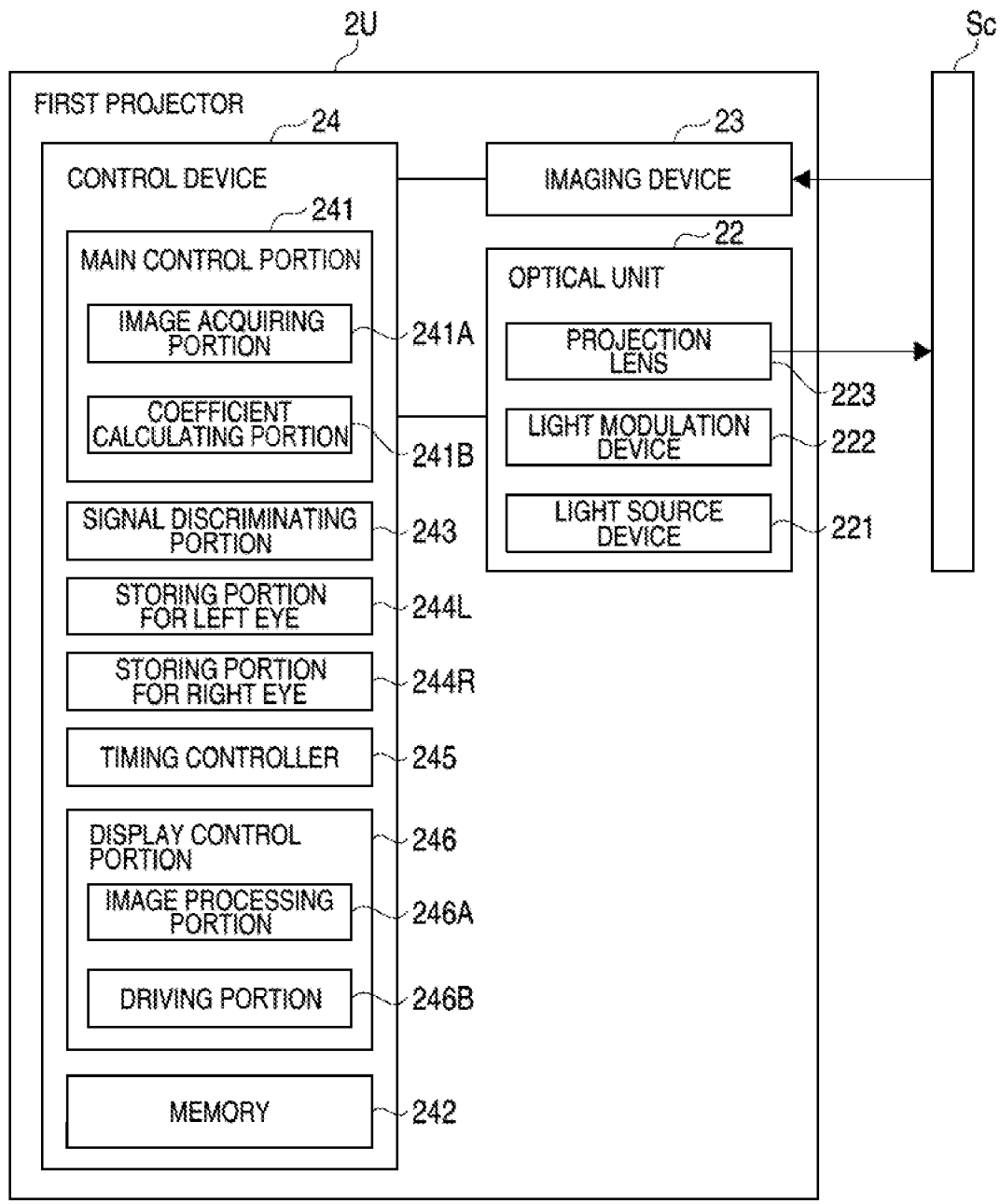
FIG. 2 is a block diagram showing a control structure of a first projector in the embodiment of the invention.

FIG. 2 is a block diagram showing a control structure of the first projector 2U.

The first projector 2U forms an image for the left eye and projects the image for the left eye on the screen Sc with predetermined linearly polarized light (hereinafter, first linearly polarized light).

The second projector 2D forms an image for the right eye and projects the image for the right eye on the screen Sc with second linearly polarized light, a polarizing direction of which is orthogonal to the first linearly polarized light.

A projected image PF obtained by superimposing the image for the left eye and the image for the right eye one on top of the other is displayed on the screen Sc.

The first and second projectors 2U and 2D explained above have the same configuration.

Therefore, the configuration of the first projector 2U is mainly explained below. Components of the second projector 2D are denoted by reference numerals and signs same as those of the first projector 2U and explanation of the components is omitted.

The first projector 2U includes, as shown in FIG. 1 or 2, an optical unit 22 (FIG. 2), an imaging device 23 (FIG. 2), and a control device 24 (FIG. 2) housed on the inside of an armor housing 21 (FIG. 1) that configures an armor.

The armor housing 21 is formed in a substantially rectangular parallelepiped shape including, as shown in FIG. 1, a top surface 21A located on the upward side, a bottom surface 21B located on the downward side, a front surface 21C located on a projection side, a rear surface 21D located on the opposite side of the projection side, and side surfaces 21E and 21F located on sides in the case of normal placement setting (FIG. 1) in which the projector 2U is set on a floor, a desk, or the like.

Components explained below are provided on the top surface 21A (see FIG. 3).

On the top surface 21A, an operation panel 211 including a power button 211A and an operation button 211B for performing the stack projection is provided on the rear surface 21D side.

On the top surface 21A, an operation button 212A for enlarging or reducing an image on the screen Sc and an operation button 212B for focusing the image on the screen Sc are provided on the front surface 21C side.

Further, on the top surface 21A, an opening portion 213 is formed on the front surface 21C side.

A zoom ring 212C and a focus ring 212D connected to a projection lens 223, which configures the optical unit 22, are exposed to the outside.

The zoom ring 212C is a member configured to be rotatable and adjust a zoom position in the projection lens 223.

The focus ring 212D is a member configured to be rotatable and adjust a focus position in the projection lens 223.

On the top surface 21A, an operation dial 212E for operating a lens shutter (not shown in the figure) for performing opening and closing of a projection port 214 for allowing an image projected from the projection lens 223 to pass is provided on the front surface 21C side.

The members 212A to 212E explained above are equivalent to an operation portion 212 in this embodiment.

The optical unit 22 includes, as shown in FIG. 2, a light source device 221, a light modulation device 222 such as a liquid crystal panel, and a projection lens 223. A light beam emitted from the light source device 221 is modulated by the light modulation device 222 and projected on the screen Sc from the projection lens 223.

The first and second projectors 2U and 2D are set to perform so-called tilting projection for projecting an image higher than a right-opposed position in the normal placement setting.

The imaging device 23 picks up an image of the screen Sc under the control by the control device 24 and outputs a signal corresponding to the picked-up image to the control device 24.

In this embodiment, although specific illustration of the imaging device 23 is omitted, the image pickup device 23 is configured by a 3CCD camera including a CCD (Charge Coupled Device) for red configured to detect red light, a CCD for green configured to detect green light, and a CCD for blue configured to detect blue light.

The imaging device 23 outputs R, G, and B signals (signals corresponding to a picked-up image) detected by the CCDs for red, green, and blue to the control device 24.

The control device 24 includes, as shown in FIG. 2, a main control portion 241 including a CPU (Central Processing Unit). The control device 24 controls the entire first projector 2U according to a control program stored in a memory 242.

The control device 24 includes, as shown in FIG. 2, besides the main control portion 241 and the memory 242, a signal discriminating portion 243, a storing portion for left eye 244L, a storing portion for right eye 244R, a timing controller 245, and a display control portion 246.

The signal discriminating portion 243 discriminates an image signal for the left eye and an image signal for the right eye from left and right image signals included in an input signal input from the outside.

The signal discriminating portion 243 causes the storing portion for left eye 244L to store the image signal for the left eye as image data for the left eye and causes the storing portion for right eye 244R to store the image signal for the right eye as image data for the right eye.

The image data for the left and right eyes stored in the storing portions for left and right eyes 244L and 244R are respectively formed by a set of data for each one frame.

The display control portion 246 reads out one of the image data for the left and right eyes stored in the storing portions for left and right eyes 244L and 244R and causes the light modulation device 222 to form an image based on the read-out image data.

For example, the display control portion 246 recognizes ON or OFF of a DIP switch (not shown in the figure) provided to be exposed to the outside of the armor housing 21 to recognize whether the projector including the display control portion 246 is a first projector that projects an image for the left eye or a second projector that projects an image for the right eye.

If recognizing that the projector is the first projector, the display control portion 246 reads out the image data for the left eye stored in the storing portion for left eye 244L and causes the light modulation device 222 to form an image for the left eye. On the other hand, if recognizing that the projector is the second projector, the display control portion 246 reads out the image data for the right eye stored in the storing portion for right eye 244R and causes the light modulation device 222 to form an image for the right eye.

The display control portion 246 includes an image processing portion 246A and a driving portion 246B.

The image processing portion 246A applies various kinds of image processing to the image data read out from one of the storing portions for left and right eyes 244L and 244R.

For example, the image processing portion 246A applies a three-dimensional vector operation to information (coordinates) of pixel positions of the image data using a coefficient set by the main control portion 241 to apply keystone distortion correction to the image data.

The driving portion 246B outputs a driving signal based on the image data subjected to the image processing to the image processing portion 246A to the light modulation device 222 and causes the light modulation device 222 to form an image.

The timing controller 245 reads synchronization signals (a vertical synchronization signal and a horizontal synchronization signal) included in the input signal input from the outside and causes the display control portion 246 to execute processing.

That is, the timing controllers 245 included in the first and second projectors 2U and 2D synchronize display timing for images for the left and right eyes projected on the screen Sc from the first and second projectors 2U and 2D.

The main control portion 241 outputs a control command to the display control portion 246 and the like according to the control program stored in the memory 242.

The main control portion 241 includes, as shown in FIG. 2, an image acquiring portion 241A and a coefficient calculating portion 241B.

The image acquiring portion 241A controls the operation of the imaging device 23 and causes the imaging device 23 to pick up an image of the screen Sc. The image acquiring portion 241A acquires a picked-up image on the basis of signals (R, G, and B signals) output from the imaging device 23.

The coefficient calculating portion 241B calculates, on the basis of the picked-up image acquired by the image acquiring portion 241A, the coefficient used for the keystone distortion correction in the display control portion 246.

The memory 242 stores, besides the control program, first and second image data for calibration concerning first and second image for calibration for performing the stack projection with two projectors.

Configuration of the Polarized Glasses

The polarized glasses 3 are worn by the observer. The polarized glasses 3 include, as shown in FIG. 1, a transmitting portion for left eye 31 and a transmitting portion for right eye 32.

The transmitting portion for left eye 31 is configured by a polarized lens, a transmission axis of which is in the same direction as the polarizing direction of the first linearly polarized light.

The transmitting portion for right eye 32 is configured by a polarizing lens, a transmission axis of which is in the same direction as the polarizing direction of the second linearly polarized light.

With the configuration explained above, in the projection system 1, the image for the left eye included in the projected image PF on the screen Sc is recognized by only the left eye of the observer through the transmitting portion for left eye 31. The image for the right eye included in the projected image PF is recognized by only the right eye of the observer through the transmitting portion for right eye 32.

Therefore, the observer stereoscopically views the projected image PF on the screen Sc with a parallax.

Configuration of the Support

Figure 3:
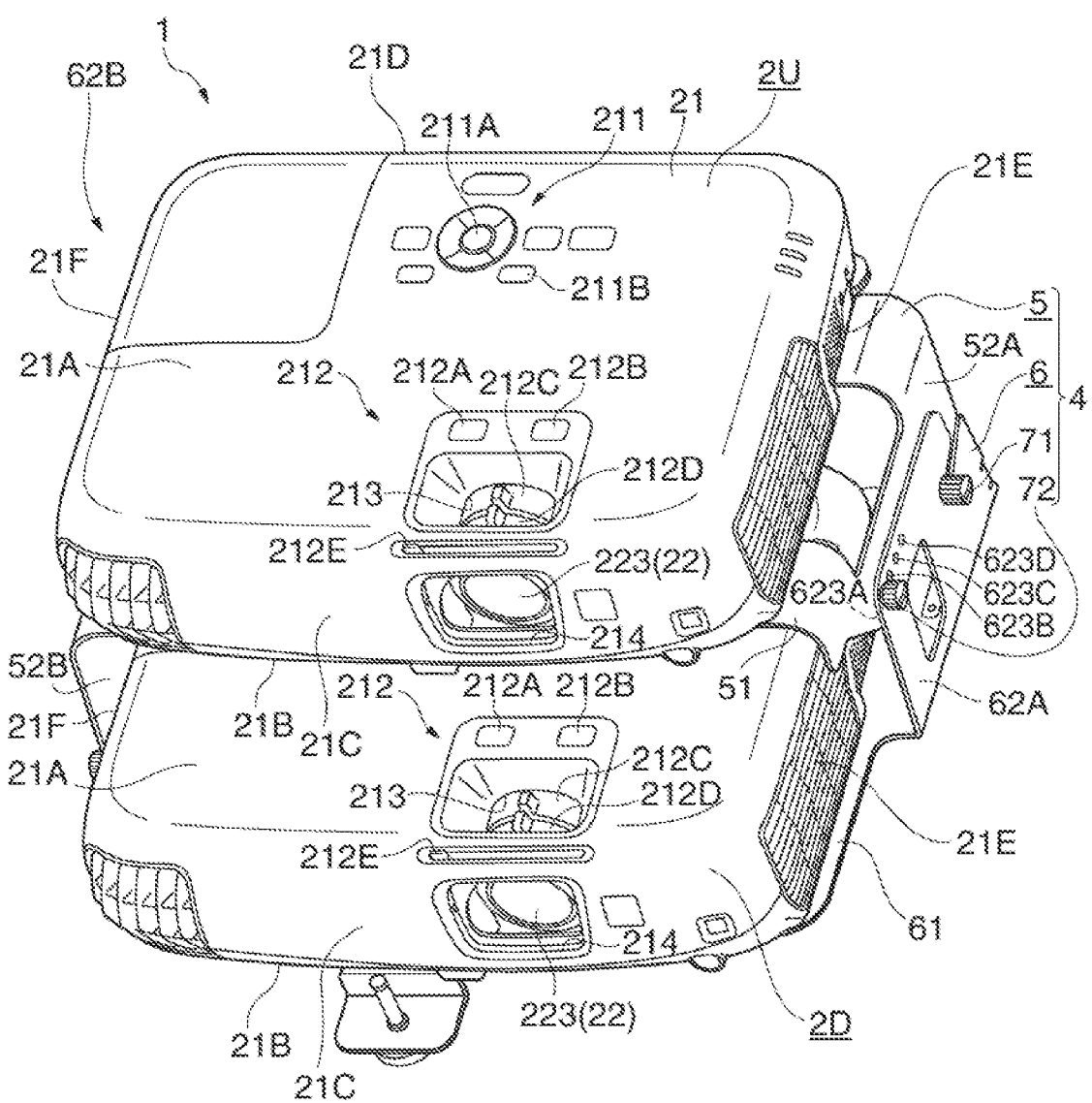
FIG. 3 is a diagram showing the configuration of a support in an embodiment of the invention.
Figure 4:
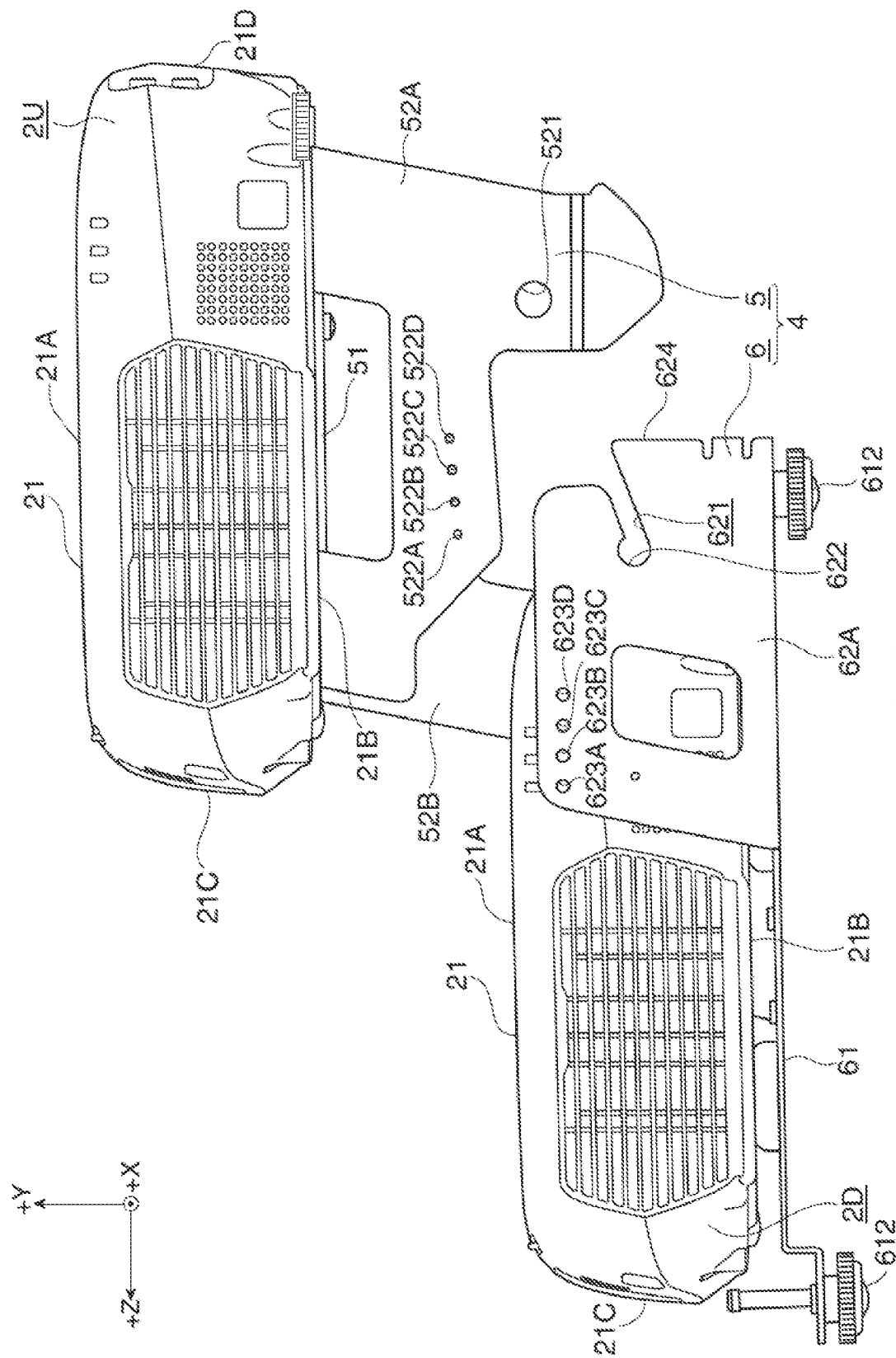
FIG. 4 is a diagram showing the configuration of the support in the embodiment of the invention.
Figure 6:
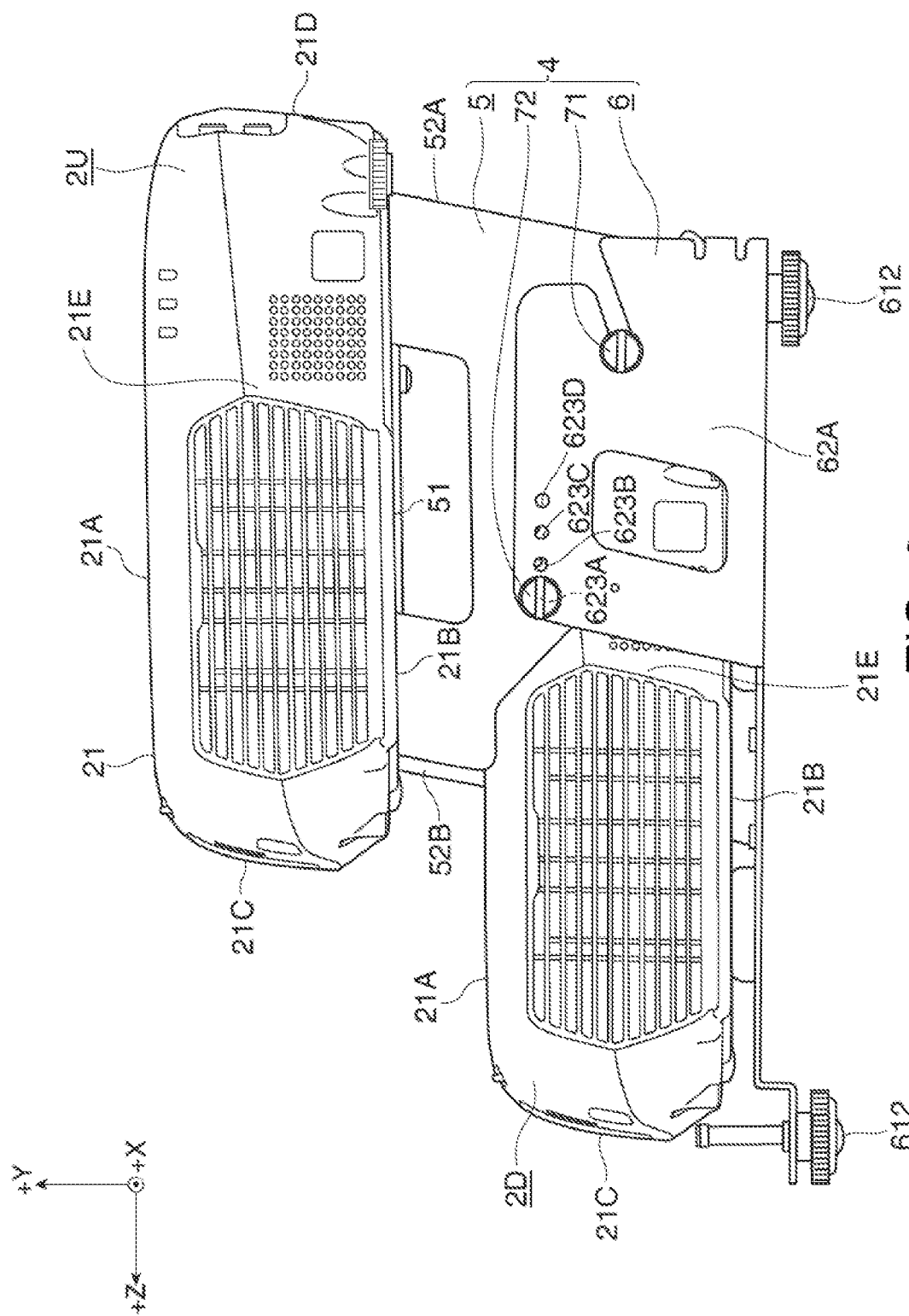
FIG. 6 is a diagram showing the configuration of the support in the embodiment of the invention.

FIGS. 3 to 6 are diagrams showing the configuration of the support 4. Specifically, FIG. 3 is a front perspective view (on the projection side) of a state in which the first and second projectors 2U and 2D are supported by the support 4 and the first projector 2U is located in a first position. FIG. 4 is a side view of the support 4 in a disassembled state. FIG. 5 is a front perspective view of a state in which the first and second projectors 2U and 2D are supported by the support 4 and the first projector 2U is located in a second position. FIG. 6 is a side view of the state shown in FIG. 3.

FIGS. 3 to 6 illustrate the normal placement setting (a posture in which the top surfaces 21A of the first and second projectors 2U and 2D are located on the upward side with respect to the bottom surfaces 21B (a posture in which a first supporting member 5 is located on the upward side with respect to a second supporting member 6 set on the floor or the like)).

In the following explanation, for convenience of explanation, a projecting direction of an image from the second projector 2D is represented as Z axis (the projecting direction is represented as + and the opposite direction of the projecting direction is represented as −), a horizontal axis orthogonal to the Z axis is represented as X axis, and a vertical axis orthogonal to the Z axis is represented as Y axis (an upward side in the normal placement setting is represented as + and a downward side is represented as −) (FIGS. 3 to 6).

The support 4 supports the first and second projectors 2U and 2D.

The support 4 includes, as shown in FIGS. 3 to 6, the first supporting member 5, the second supporting member 6, an attachment screw 71, and a positioning screw 72.

Configuration of the First Supporting Member

The first supporting member 5 is a member that supports the first projector 2U.

The first supporting member 5 includes, as shown in FIGS. 3 to 6, a first fixing portion 51 and a pair of first connecting portions 52A and 52B.

The first fixing portion 51 is configured by a rectangular plate body having size substantially the same as the size of the bottom surface 21B of the first projector 2U.

As shown in FIGS. 3 and 6, the first projector 2U (the bottom surface 21B) is fixed to a plate surface (an upper surface in FIGS. 3 to 6) of the first fixing portion 51 by screws (not shown in the figures).

The pair of first connecting portions 52A and 52B is configured by plate bodies respectively connected to end edges, which are opposed to each other along the X-axis direction in the first fixing portion 51, and vertically provided toward the downward side in FIGS. 3 to 6 from the end edges.

More specifically, as shown in FIGS. 3 to 6, the pair of first connecting portions 52A and 52B is configured by plate bodies parallel to a YZ plane.

The pair of first connecting portions 52A and 52B has the same functions (an attachment hole 521 and positioning screw holes 522A to 522D explained below). Therefore, the first connecting portion 52A located on the right side in FIG. 3 is mainly explained below.

In the first connecting portion 52A, as shown in FIG. 4, the attachment hole 521 is formed that pierces through the first connecting portion 52A along the X-axis direction and into which an attachment screw 71 explained below is screwed.

The attachment holes 521 formed in the pair of first connecting portions 52A and 52B are not specifically shown in the figure. However, the attachment holes 521 are formed in positions opposed to each other along the X-axis direction.

In the first connecting portion 52A, as shown in FIG. 4, four positioning screw holes 522A to 522D are formed that pierce through the first connecting portion 52A along the X-axis direction and into which the positioning screw 72 explained below is screwed.

Functions of the four positioning screw holes 522A to 522D are explained below.

Configuration of the Second Supporting Member

The second supporting member 6 is a member that supports the second projector 2D.

The second supporting member 6 includes, as shown in FIGS. 3 to 6, a second fixing portion 61 and a pair of second connecting portions 62A and 62B (FIGS. 3 and 5), which are substantially the same as those in the first supporting member 5.

The second fixing portion 61 is configured by a rectangular plate body, a dimension in the X-axis direction of which is set slightly larger than the bottom surface 21B of the second projector 2D.

As shown in FIGS. 3 to 6, the second projector 2D (the bottom surface 21B) is fixed to a plate surface (an upper surface in FIGS. 3 to 6) of the second fixing portion 61 by screws (not shown in the figures). Although not explained in detail, in the second fixing portion 61, a plurality of leg portions 612 (FIGS. 4 and 6) that come into contact with a setting surface when the second projector 2D is normally placed and set.

The pair of second connecting portions 62A and 62B is configured by plate bodies respectively connected to end edges, which are opposed to each other along the X-axis direction in the second fixing portion 61, and vertically provided toward the upward side in FIGS. 3 to 6 from the part of the end edges.

More specifically, as shown in FIGS. 3 to 6, like the pair of first connecting portions 52A and 52B, the pair of second connecting portions 62A and 62B is configured by plate bodies parallel to the YZ plane.

In a state in which the support 4 is assembled, the pair of second connecting portions 62A and 62B is located in positions where the pair of second connecting portions 62A and 62B holds the pair of first connecting portions 52A and 52B from both sides in the X-axis direction.

The pair of second connecting portions 62A and 62B has the same functions (a slit 621, an insert hole 622, and four positioning insert holes 623A to 623D explained below). Therefore, the second connecting portion 62A located on the right side in FIG. 3 is mainly explained below.

As shown in FIG. 4, the second connecting portion 62A has a substantially rectangular shape in plan view.

In the second connecting portion 62A, the slit 621, the insert hole 622, and the four positioning insert holes 623A to 623D are formed.

As shown in FIG. 4, the slit 621 is formed to extend from an end edge 624 on the −Z-axis side in the second connecting portion 62A toward a position opposed to the attachment hole 521 in the state in which the support 4 is assembled.

As shown in FIG. 4, the insert hole 622 is formed by a circular hole that pierces through the second connecting portion 62A along the X-axis direction and communicates with the slit 621. The insert hole 622 is formed in the position opposed to the attachment hole 521 in the state in which the support 4 is assembled.

As shown in FIG. 4, the insert hole 622 is formed such that the inner diameter dimension thereof is larger than the width dimension of the slit 621.

As shown in FIGS. 3 to 6, the four positioning insert holes 623A to 623D are holes that pierce through the second connecting portion 62A along the X-axis direction and through which the positioning screw 72 explained below is inserted.

A function of the four positioning insert holes 623A to 623D is explained below.

Configuration of the Attachment Screw

The attachment screw 71 connects the first and second supporting members 5 and 6 and functions as a rotation axis.

The attachment screw 71 relatively rotates the first and second supporting members 5 and 6 about the rotation axis (the X axis).

Specifically, the first and second supporting members 5 and 6 are connected by the attachment screw 71, whereby the first and second projectors 2U and 2D fixed to the first and second supporting members 5 and 6 are arranged as explained below.

As shown in FIGS. 3 to 6, the first projector 2U is arranged on the top surface 21A side of the second projector 2D.

As shown in FIGS. 3 to 6, the first projector 2U is arranged such that the projection lens 223 faces the same side (the +Z-axis side) as the projection lens 223 in the second projector 2D.

Further, the first and second supporting members 5 and 6 relatively rotate with the attachment screw 71 set as the rotation axis (the X axis), whereby the first projector 2U is located in the first position (FIG. 3) or the second position (FIG. 5).

As shown in FIG. 3, the first position is a position where the bottom surface 21B of the first projector 2U is close to the top surface 21A of the second projector 2D and the first projector 2U covers a part of the top surface 21A (a region on the −Z-axis side on the top surface 21A) of the second projector 2D.

In other words, the first position is a position where the first and second projectors 2U and 2D are provided in parallel along the thickness direction (a direction from the top surface 21A to the bottom surface 21B) of the first and second projectors 2U and 2D.

As shown in FIG. 6, the first projector 2U is located in a position shifted in the −Z-axis direction with respect to the second projector 2D, that is, arranged to increase a projection distance in a state in which the first projector 2U is located in the first position.

In a state in which the first projector 2U is located in the first position, as shown in FIG. 3, the operation portion 212 in the second projector 2D is provided on the +Z-axis side (the front surface 21C side) on the top surface 21A. Therefore, the operation portion 212 is not covered by the first projector 2U.

As shown in FIG. 5, the second position is a position where the bottom surface 21B of the first projector 2U is spaced apart from the top surface 21A of the second projector 2D (the front surface 21C is spaced apart from the second projector 2D) and uncovers the top surface 21A of the second projector 2D.

Configuration of the Positioning Screw

The positioning screw 72 has a function of adjusting a rotating position of the first supporting member 5 with respect to the second supporting member 6 (a projecting position of the first projector 2U) in conjunction with the four positioning screw holes 522A to 522D (FIG. 5) formed in the first supporting member 5 and the four positioning insert holes 623A to 623D (FIGS. 3 to 6) formed in the second supporting member 6.

For example, as shown in FIG. 6, the positioning screw 72 is inserted through the positioning insert hole 623A and the positioning screw 72 is screwed into the positioning screw hole 522A, whereby the rotation of the first supporting member 5 with respect to the second supporting member 6 is regulated.

In this embodiment, the rotating position of the first supporting member 5 with respect to the second supporting member 6 can be adjusted in four stages.

That is, when the positioning screw 72 is screwed using the positioning screw hole 522A and the positioning insert hole 623A, the first supporting member 5 is specified in a first rotating position.

Similarly, when the positioning screw hole 522B and the positioning insert hole 623B are used, when the positioning screw holes 522C and the positioning insert hole 623C are used, and when the positioning screw holes 522D and the positioning insert hole 623D are used, the first supporting member 5 is respectively specified in second to fourth rotating positions.

As the rotating position of the first supporting member 5 with respect to the second supporting member 6, a rotating position corresponding to a projection distance from the second projector 2D to the screen Sc (FIG. 1) is selected. Therefore, the rotating position is set to make it easy to superimpose an image for the left eye and an image for the right eye projected on the screen Sc one on top of the other.

For the support 4 explained above, besides the normal placement setting, ceiling suspension setting in which the first and second projectors 2U and 2D are vertically reversed from the normal placement setting and set on the ceiling or the like can be adopted.

Image Display Method

An image display method for displaying an image using the projection system is explained.

Figure 7:
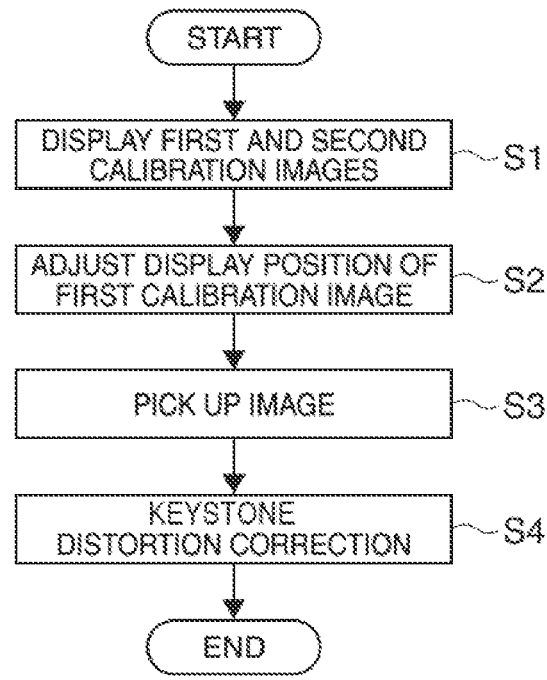
FIG. 7 is a flowchart for explaining an image display method in the embodiment of the invention.
Figure 8A:
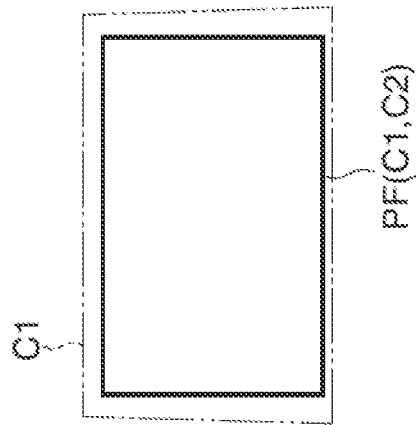
FIG. 8A is a diagram for explaining the image display method in the embodiment of the invention.
Figure 8B:
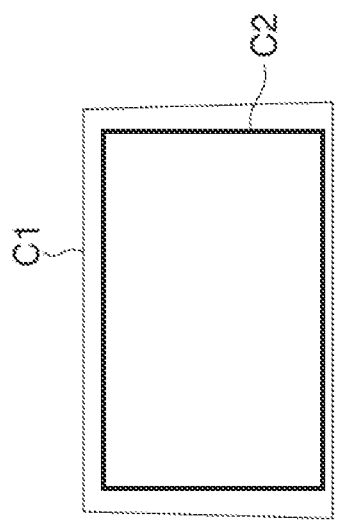
FIG. 8B is a diagram for explaining the image display method in the embodiment of the invention.
Figure 8C:
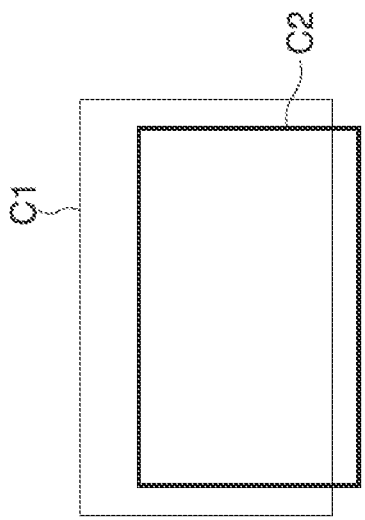
FIG. 8C is a diagram for explaining the image display method in the embodiment of the invention.

FIG. 7 is a flowchart for explaining the image display method. FIGS. 8A to 8C are diagrams for explaining the image display method.

In the following explanation, the first and second projectors 2U and 2D recognize, for example, ON or OFF of the DIP switch to recognize whether the projectors are the first projector or the second projector.

First, a user executes, as preparation steps, steps S1 and S2 explained below.

In step S1, the user depresses the operation button 211B of the first projector 2U.

In the first projector 2U, when recognizing the depression of the operation button 211B, the main control portion 241 outputs a control command to the display control portion 246.

According to the control command from the main control portion 241, the display control portion 246 reads out first image data for calibration corresponding to the first projector 2U from the memory 242 and causes the light modulation device 222 to form a first image for calibration.

The first image for calibration is an image formed by a blue rectangular frame.

On the screen Sc, as shown in FIG. 8A, a first projected image for calibration C1 (a projected image corresponding to the first image for calibration formed by the light modulation device 222) projected from the first projector 2U is displayed.

Although not specifically shown in the figures, the first and second projectors 2U and 2D are electrically connected by a signal cable for enabling transmission and reception of a predetermined signal.

When the operation button 211B of the first projector 2U is depressed, the predetermined signal is output from the first projector 2U to the second projector 2D via the signal cable.

In the second projector 2D, when recognizing an input of the signal from the first projector 2U, the main control portion 241 outputs a control command to the display control portion 246.

According to the control command from the main control portion 241, the display control portion 246 reads out second image data for calibration corresponding to the second projector 2D from the memory 242 and causes the light modulation device 222 to form a second image for calibration.

The second image for calibration is an image formed by a red rectangular frame.

On the screen Sc, as shown in FIG. 8A, a second projected image for calibration C2 (a projected image corresponding to the second image for calibration formed by the light modulation device 222) projected from the second projector 2D is displayed.

In a state shown in FIG. 8A, the position of a unit to which the first and second projectors 2U and 2D and the support 4 are fixed and the position of the screen Sc are adjusted by the user such that the second projected image for calibration C2 projected from the second projector 2D is formed in a rectangular shape after the first and second projected images for calibration C1 and C2 are displayed on the screen Sc.

The first and second images for calibration formed by the light modulation devices 222 of the first and second projectors 2U and 2D are images formed by rectangular frames of the same size.

However, as explained above, the projection distance of the first projector 2U is set longer than the projection distance of the second projector 2D. Therefore, as shown in FIG. 8A, the size of the first projected image for calibration C1 on the screen Sc is larger than the size of the second projected image for calibration C2.

In step S2, the user adjusts a projecting position of the first projector 2U (a display position of the first projected image for calibration C1) using the positioning screw 72.

Specifically, the user sets the rotating position of the first supporting member 5 in any one of the first to fourth rotating positions such that the second projected image for calibration C2 is fit in the first projected image for calibration C1.

In step S2, when the projecting position of the first projector 2U is adjusted, since a projection angle is changed, the first projected image for calibration C1 on the screen Sc is distorted from a rectangular shape shown in FIG. 8A into a trapezoidal shape shown in FIG. 8B.

After the preparation steps S1 and S2, the user depresses the operation button 211B of the first projector 2U again.

In the first projector 2U, when recognizing the second depression of the operation button 211B, the main control portion 241 controls the operation of the imaging device 23, causes the imaging device 23 to pick up an image of the screen Sc, and acquires the picked-up image (step S3).

As explained above, the imaging device 23 is configured by the 3CCD camera. Therefore, the blue first projected image for calibration C1 is detected by a CCD for blue in the imaging device 23 and output to the control device as a B signal. The red second projected image for calibration C2 is detected by a CCD for red in the imaging device 23 and output to the control device 24 as an R signal.

The main control portion 241 recognizes the first and second projected images for calibration C1 and C2 according to the B and R signals output from the imaging device 23. The main control portion 241 calculates, with reference to the second projected image for calibration C2, a coefficient for adjusting the first projected image for calibration C1 to the second projected image for calibration C2 and sets the coefficient in the display control portion 246.

When the coefficient is set in the display control portion 246 as explained above, the display control portion 246 applies, using the coefficient, a three-dimensional vector operation to information concerning pixel positions of the first image data for calibration stored in the memory 242 to apply keystone distortion correction to the first image data for calibration (step S4).

When the keystone distortion correction is applied, the trapezoidal first projected image for calibration C1 shown in FIG. 8B (the first projected image for calibration C1 indicated by an alternate long and two short dashes line in FIG. 8C) overlaps the second projected image for calibration C2 and is calibrated into the rectangular first projected image for calibration C1 indicated by a solid line in FIG. 8C.

According to this embodiment explained above, there is an effect explained below.

In this embodiment, the projection system 1 includes the support 4.

Consequently, the user can easily specify a relative positional relation between the first and second projectors 2U and 2D by causing the support 4 to support the first and second projectors 2U and 2D.

Therefore, when the projection system 1 including the first and second projectors 2U and 2D is built, if the support 4 is used, it is possible to easily build the projection system 1.

FIGS. 9A to 9C are diagrams for explaining an effect in this embodiment. Specifically, FIGS. 9A to 9C show states in which steps S1, S2, and S4 are respectively carried out in a configuration different from the configuration in this embodiment (a configuration in which the first projector 2U does not shift in the −Z-axis side with respect to the second projector 2D and the projection distances of the first and second projectors 2U and 2D are set the same). That is, FIGS. 9A to 9C are diagrams respectively corresponding to FIGS. 8A to 8C.

For example, when the projecting distances of the first and second projectors 2U and 2D are set the same, a problem explained below occurs.

First, in the first projector 2U, a posture in projecting the rectangular first projected image for calibration C1 (the projected image of the same size as the second projected image for calibration C2) before being superimposed on the second projected image for calibration C2 is referred to as first posture (FIG. 9A) and a posture in changing a tilt from the first posture and projecting the first projected image for calibration C1 that can be superimposed on the second projected image for calibration C2 is referred to as second posture (FIG. 9B).

In the second posture, keystone distortion occurs in the first projected image for calibration C1 that is rectangular in the first posture. However, the trapezoidal first projected image for calibration C1 is calibrated into the rectangular shape by being subjected to keystone distortion correction (FIG. 9C). The size of the calibrated rectangular first projected image for calibration C1 is small compared with the size of the first projected image for calibration C1 projected on the screen Sc in the first posture (FIG. 9A).

That is, in the second projector 2D, as shown in FIGS. 9B and 9C, it is necessary to reduce the size of the second projected image for calibration C2 according to the size of the first projected image for calibration C1 reduced by the keystone distortion correction in the first projector 2U. Therefore, as shown in FIG. 9C, the size of the projected image PF obtained by superimposing the first and second projected images for calibration C1 and C2 one on top of the other is reduced.

In this embodiment, the support 4 supports the first and second projectors 2U and 2D in a state in which the projecting distances of the first and second projectors 2U and 2D are different.

That is, the projecting distance of the first projector 2U is set longer than the projecting distance of the second projector 2D. Therefore, when the first projector 2U is set in the first posture, the size of the rectangular first projected image for calibration C1 projected on the screen Sc is larger than the size of the second projected image for calibration C2 (FIG. 8A). Similarly, when the first projector 2U is arranged in the second posture, the size of the trapezoidal first projected image for calibration C1 projected on the screen Sc is also larger than the size of the second projected image for calibration C2 (FIG. 8B).

Therefore, when the first projected image for calibration C1 is superimposed on the rectangular second projected image for calibration C2, the size of the first projected image for calibration C1 projected on the screen Sc can beset large in advance. Therefore, if the first projected image for calibration C1 is calibrated into the rectangular shape by the keystone distortion correction in the first projector 2U, it is possible to superimpose the first and second projected images for calibration C1 and C2 one on top of the other without reducing the size of the second projected image for calibration C2. That is, the size of the rectangular projected image PF obtained by superimposing the first and second projected images for calibration C1 and C2 one on top of the other is not reduced.

Even if a configuration for accurately supporting the first and second projectors 2U and 2D is not adopted, by shifting the first and second projectors 2U and 2D in the Z-axis direction, it is possible to prevent, with a simple configuration, the superimposed projected image PF from being reduced in size.

Specifically, it is unnecessary to finely adjust the positions of the first and second projectors 2U and 2D with screws or the like on the support 4. Even if fluctuation in dimensions of components or assembly fluctuation occurs, it is possible to surely superimpose the first projected image for calibration C1 on the second projected image for calibration C2 set as a reference.

Further, the support 4 supports the first and second projectors 2U and 2D such that the first and second projectors 2U and 2D are provided in parallel along the thickness direction.

Consequently, in the first and second projectors 2U and 2D, it is possible to locate the projection lenses 223 in adjacent positions.

For example, when the projection lenses 223 are located in positions space apart from each other, a projection angle of an image projected on the screen Sc from the second projector 2D and a projection angle of an image projected on the screen Sc from the first projector 2U are greatly different.

That is, in step S2, when the projecting position of the first projector 2U is adjusted such that the second projected image for calibration C2 is fit in the first projected image for calibration C1, a distortion degree of the trapezoidal shape of the first projected image for calibration C1 is large when the projection lenses 223 are provided in the positions spaced apart from each other compared with when the projection lenses 223 are located in the positions close to each other.

Therefore, by locating the projection lenses 223 in the positions close to each other, it is possible to superimpose the first projected image for calibration C1 on the second projected image for calibration C2 while reducing a processing load in performing the keystone distortion correction.

By supporting the first and second projectors 2U and 2D with the support 4 as explained above, it is possible to compactly integrate the first and second projectors 2U and 2D and the support 4 as a unit.

Further, the operation portion 212 is provided in a region other than the region covered by the first projector 2U on the top surface 21A of the second projector 2D in a state in which the first projector 2U is located in the first position.

Consequently, even when the first projector 2U is located in the first position, it is possible to allow the user to operate the operation portion 212. Therefore, it is possible to secure the operability of the second projector 2D.

Second Embodiment

In explanation of a second embodiment, explanation of contents and components same as those in the first embodiment is omitted. Only characteristic parts are explained below.

Configuration of the Support

The support 4 in this embodiment supports the first and second projectors 2U and 2D to be arranged in a stack.

Specifically, as shown in FIG. 3, the support 4 supports the first and second projectors 2U and 2D such that the first projector 2U is arranged on the top plate 21A side of the second projector 2D and the projection lenses 223 of the first and second projectors 2U and 2D face the same side.

The support 4 is configured to enable the normal placement setting in which the first and second projectors 2U and 2D are set on a floor or a desk (a posture in which the top surfaces 21A of the first and second projectors 2U and 2D are located on the upward side with respect to the bottom surfaces 21B and the first projector 2U is located on the upward side of the second projector 2D) and the ceiling suspension setting in which the first and second projectors 2U and 2D are vertically reversed from the normal placement setting and set on a ceiling or the like. FIGS. 3 and 4 illustrate the normal placement setting.

As shown in FIGS. 3 and 4, the support 4 includes the first supporting member 5, the second supporting member 6, a pair of attachment screws 71 (FIG. 3), and a pair of positioning screws 72 (FIG. 3).

In FIG. 4, for convenience of explanation, the pair of attachment screws 71 and the pair of positioning screws 72 are not shown.

Configuration of the Second Supporting Member

Figure 10:
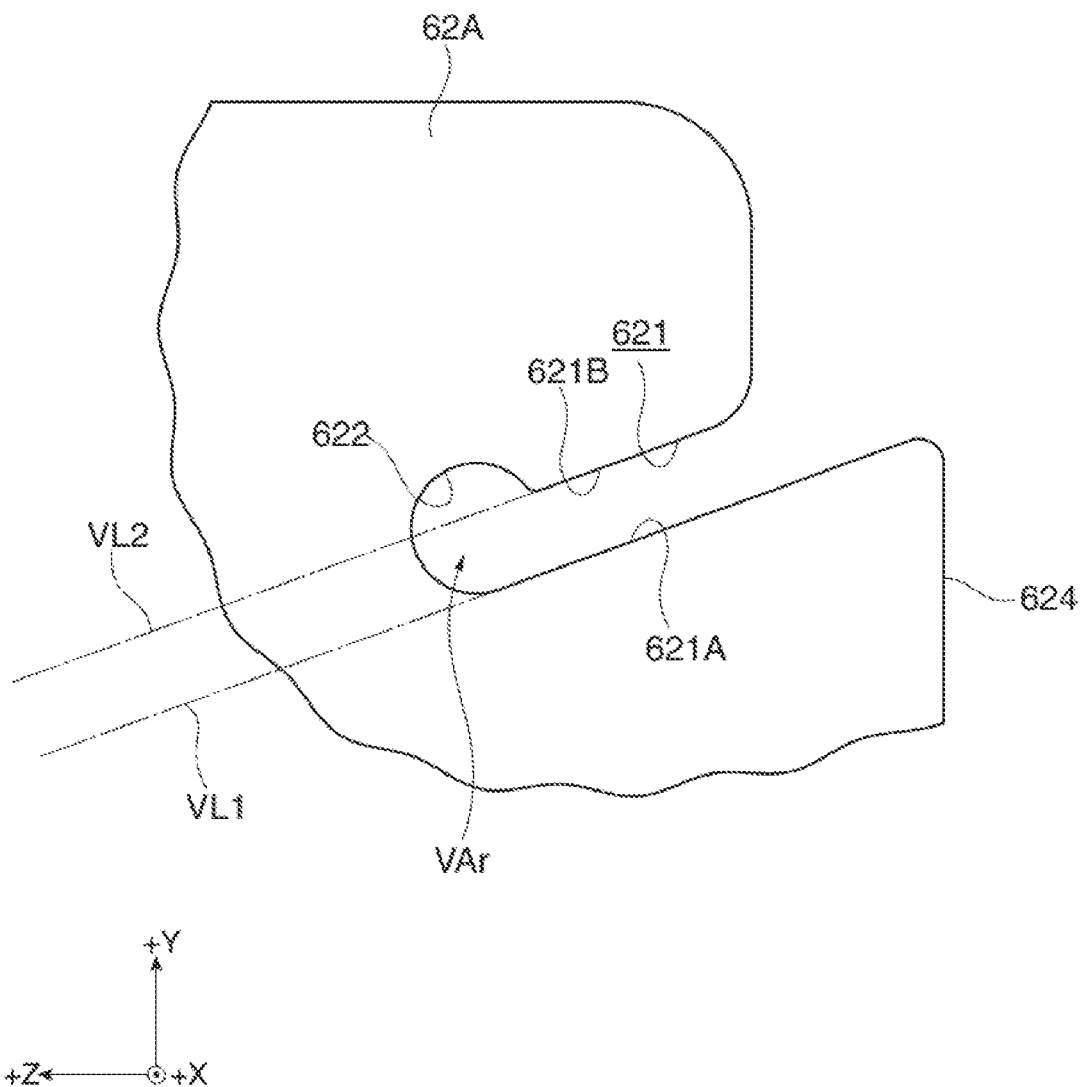
FIG. 10 is an enlarged view of a part of FIG. 4.

FIG. 10 is an enlarged view of a part of the second supporting member 6 in this embodiment and is an enlarged view of a part of FIG. 4. Specifically, FIG. 10 is an enlarged view of a region where the slit 621 and the insert hole 622 are formed in the second connecting portion 62A.

As shown in FIG. 4 or 10, the slit 621 is formed to extend from an end edge 624 on the −Z-axis side in the second connecting portion 62A toward the position opposed to the attachment hole 521 in the state in which the support 4 is assembled.

More specifically, in the case of the normal placement setting, the slit 621 is formed to incline to the downward side and extend linearly from the end edge 624 on the −Z-axis side in the second connecting portion 62A toward the position opposed to the attachment hole 521.

In the following explanation, in the case of the normal placement setting, an edge located on the downward side of the edges 621A and 621B of the slit 621 is referred to as lower edge 621A and an edge located on the upward side is referred to as upper edge 621B (FIGS. 4 and 10).

The end edge 624 has a stepped shape in which the downward side of the slit 621 in the normal placement setting further projects to the −Z-axis side than the upward side.

As shown in FIG. 4 or 10, the insert hole 622 is formed by a circular hole that pierces through the second connecting portion 62A along the X-axis direction and communicates with the slit 621 and is formed in the position opposed to the attachment hole 521 in a state in which the support 4 is assembled.

More specifically, the insert hole 622 has a shape explained below.

When the insert hole 622 and the slit 621 are seen in plan view, imaginary lines formed by imaginarily extending the lower edge 621A and the upper edge 621B along the direction in which the slit 621 extends are referred to as imagery lines VL1 and VL2 (FIG. 10). A region between the imaginary lines VL1 and VL2 is referred to as imaginary region VAr (FIG. 10).

When the insert hole 622 and the slit 621 are seen in plan view, as shown in FIG. 10, the insert hole 622 has a shape, apart of which protrudes to the outside of the imaginary region VAr.

In this embodiment, when the insert hole 622 and the slit 621 are seen in plan view, the insert hole 622 are formed such that a tangential line of the insert hole 622 formed by the circular hole coincides with the lower edge 621A.

The slits 621 formed in the pair of second connecting portions 62A and 62B are not specifically shown in the figure. However, the slits 621 are formed in positions opposed to each other along the X-axis direction. The insert holes 622 formed in the pair of second connecting portions 62A and 62B are formed in the same manner.

As shown in FIG. 3 or 4, the four positioning insert holes 623A to 623D are holes that pierce through the second connecting portion 62A along the X-axis direction and through which the positioning screw 72 is inserted.

A function of the four positioning insert holes 623A to 623D is explained below.

Configuration of the Attachment Screw

Figure 11:
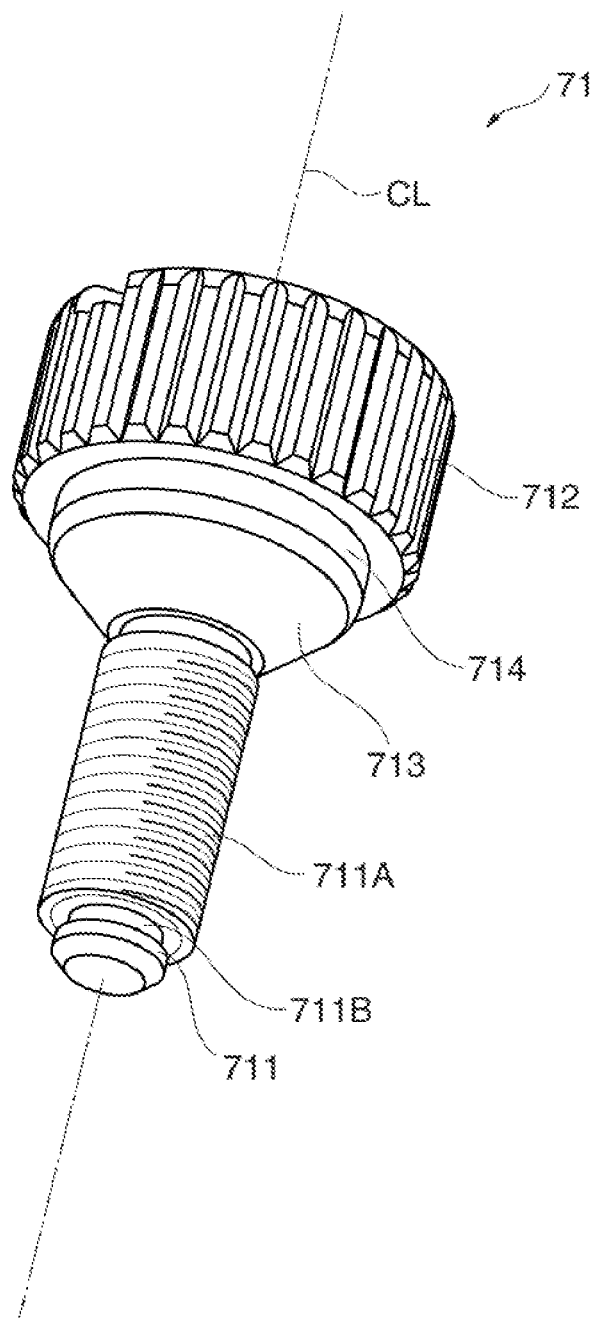
FIG. 11 is a diagram showing the configuration of an attachment screw in the embodiment of the invention.

FIG. 11 is a diagram showing the configuration of the attachment screw 71.

The pair of attachment screws 71 is configured to be capable of respectively holding the second connecting portions 62A and 62B in conjunction with the first connecting portions 52A and 52B by being screwed into the respective attachment holes 521 of the first connecting portions 52A and 52B and tightened.

Since the pair of attachment screws 71 has the same shape, only one attachment screw 71 is explained below.

The attachment screw 71 includes, as shown in FIG. 11, a shaft portion 711, a head portion 712, a taper portion 713, and a fitting portion 714.

The shaft portion 711 has a linearly-extending columnar shape. A screw groove 711A is formed in the outer circumference of the shaft portion 711.

The shaft portion 711 is screwed into the attachment hole 521.

The outer diameter dimension of the shaft portion 711 is set to be smaller than the width dimension of the slit 621 (the space dimension between the lower edge 621A and the upper edge 621B). A groove 711B in which a snap ring (not shown in the figure) is fit is formed at the distal end of the shaft portion 711. After the attachment screw 71 is screwed into the attachment hole 521, the snap ring is fit in the groove 711B to prevent the attachment screw 71 from coming off the first connecting portions 52A and 52B.

The head portion 712 is formed on one end side of the shaft portion 711 and has a substantially columnar shape.

The outer diameter dimension of the head portion 712 is set to be larger than the outer diameter dimension of the shaft portion 711 and larger than the inner diameter dimension of the insert hole 622.

The fitting portion 714 is integrally formed on an end face on the shaft portion 711 side in the head portion 712 and has a columnar shape.

The outer diameter dimension of the fitting portion 714 is set to be larger than the outer diameter dimension of the shaft portion 711 and smaller than the outer diameter dimension of the head portion 712. The outer diameter dimension of the fitting portion 714 is set to be substantially the same as the inner diameter dimension of the insert hole 622.

The taper portion 713 is a portion that connects the outer circumference of the shaft portion 711 and the outer circumference of the fitting portion 714. The taper portion 713 has a conical trapezoidal shape, the cross-sectional area of which gradually increases from the shaft portion 711 side toward the fitting portion 714 side.

The shaft portion 711, the head portion 712, the fitting portion 714, and the taper portion 713 are integrally formed such that center lines CL (FIG. 11) thereof coincide with one another.

Assembly Method for the Support

An assembly method for the support 4 for attaching the first supporting member 5 to the second supporting member 6 in a state in which the first projector 2U is fixed to the first supporting member 5 and the second projector 2D is fixed to the second supporting member 6 is explained.

Figure 12:
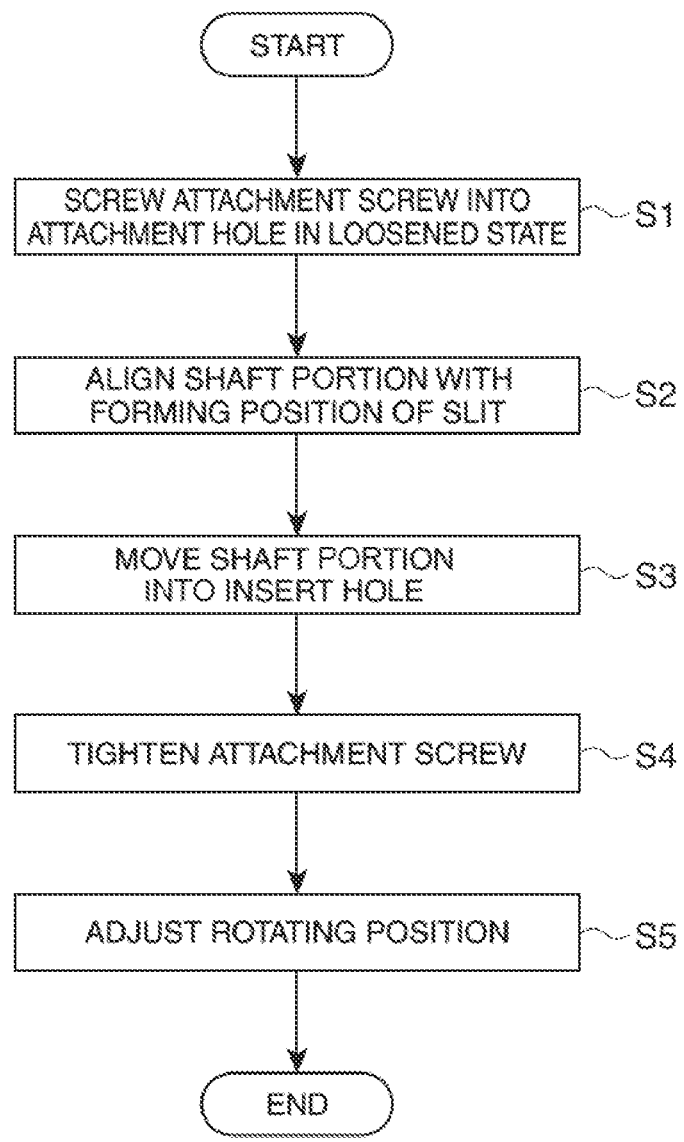
FIG. 12 is a flowchart for explaining an assembly method for the support in the embodiment of the invention.

FIG. 12 is a flowchart for explaining the assembly method for the support 4.

As the assembly method for the support 4, an assembly method in the case of the normal placement setting and an assembly method in the case of the ceiling suspension setting are explained in order blow.

Normal Placement Setting

Figure 13:
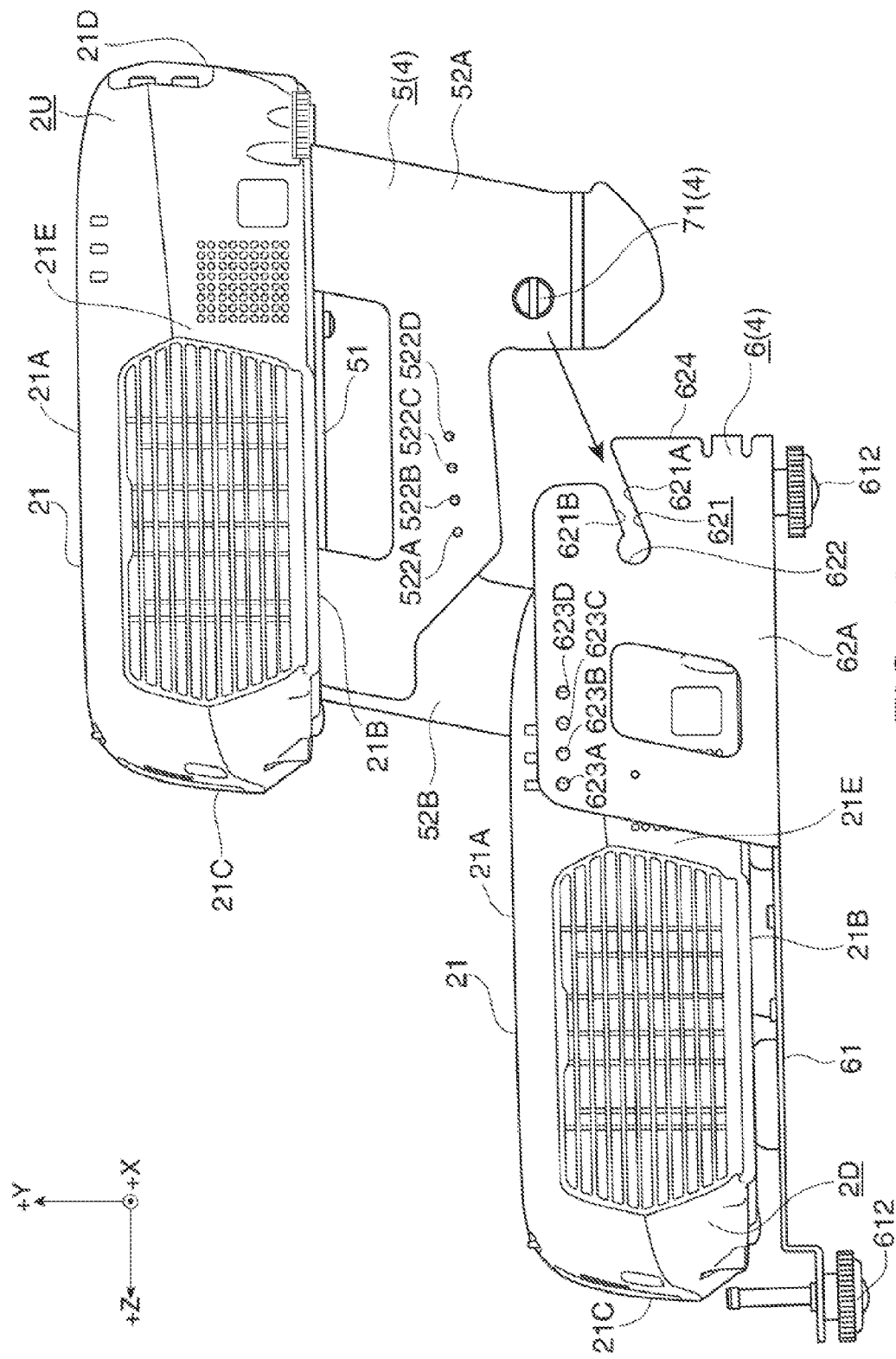
FIG. 13 is a diagram for explaining an assembly method for the support in the case of normal placement setting in the embodiment of the invention.
Figure 14A:
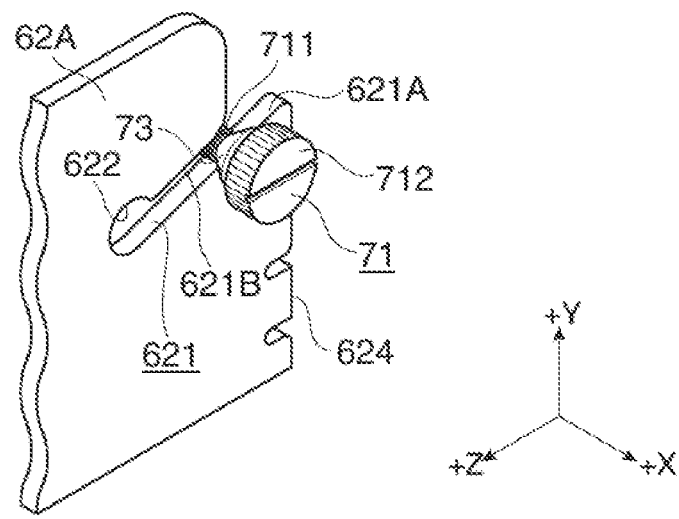
FIG. 14A is a diagram for explaining the assembly method for the support in the case of the normal placement setting in the embodiment of the invention.
Figure 14B:
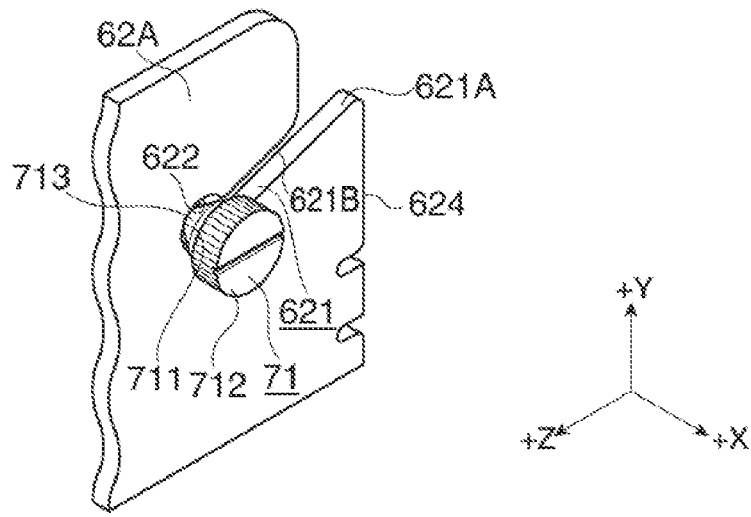
FIG. 14B is a diagram for explaining the assembly method for the support in the case of the normal placement setting in the embodiment of the invention.
Figure 14C:
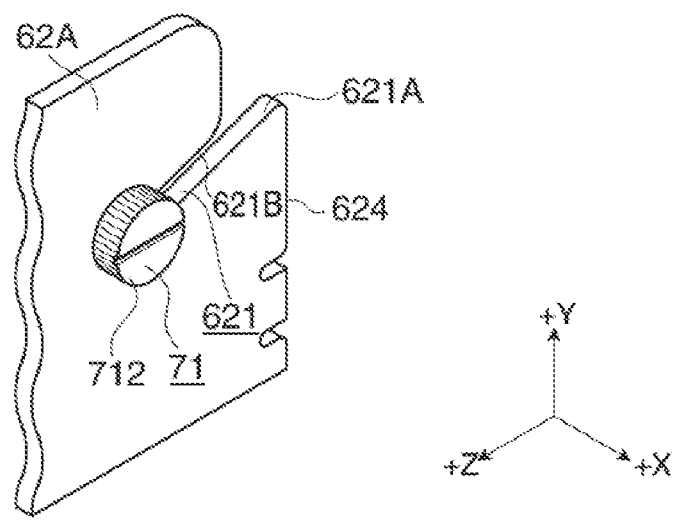
FIG. 14C is a diagram for explaining the assembly method for the support in the case of the normal placement setting in the embodiment of the invention.

FIGS. 5, 13, 14A, 14B, and 14C are diagram for explaining the assembly method for the support 4 in the case of the normal placement setting. Specifically, FIG. 13 is a diagram for explaining steps S1 and S2. In FIG. 13, a state in which the first supporting member 5 to which the first projector 2U is fixed and the second supporting member 6 to which the second projector 2D is fixed are disassembled is viewed from a side. FIGS. 14A to 14C are diagrams for explaining steps S2 to S4 and are enlarged perspective views of the second connecting portion 62A and the attachment screw 71. FIG. 5 is a perspective view showing a state after step S4 is carried out. FIG. 6 is a diagram for explaining step S5. In FIG. 6, a state after the support 4 is assembled is viewed from a side.

A relation between the first and second connecting portions 52A and 62A and the attachment screw 71 and a relation between the first and second connecting portions 52B and 62B and the attachment screw 71 are the same. Therefore, the relation between the first and second connecting portions 52A and 62A and the attachment screw 71 is mainly explained below with reference to FIGS. 5, 13, 14A, 14B, and 14C.

First, as shown in FIG. 13, the user screws the attachment screw 71 into the attachment hole 521 in a loosened state in advance (step S1).

After step S1, as explained below, the user aligns the shaft portion 711 of the attachment screw 71 with forming positions of the slits 621 in the second connecting portions 62A and 62B (step S2).

That is, as shown in FIG. 13, the user holds the first supporting member 5 by hand to locate the top surface 21A of the first projector 2U on the upward side with respect to the bottom surface 21B. The user brings the first supporting member 5 closer to the second supporting member 6 from the upward side of the second supporting member 6 (the second projector 2D) set on the floor or the like.

Specifically, the user brings the first supporting member 5 closer to the second supporting member 6 to locate the pair of first connecting portions 52A and 52B between the pair of second connecting portions 62A and 62B.

The user brings the shaft portion 711 of the attachment screw 71 into contact with stepped portions of the end edges 624 on the −Z-axis side in the second connecting portions 62A and 62B. That is, the user brings the shaft portion 711 into contact with the stepped portion of the end edge 624 on the −Z-axis side, whereby the shaft portion 711 is located in the forming position of the slit 621 at the end edge 624 on the −Z-axis side as shown in FIG. 14A.

After step S2, the user moves the first supporting member 5 (the shaft portion 711) from the upward side toward the downward side along an inclining direction of the slit 621 until the attachment hole 521 opposes the insert hole 622. As shown in FIG. 14B, the user locates the shaft portion 711 in the insert hole 622 (step S3).

After step S3, as shown in FIG. 14C, the user further tightens the attachment screw 71 into the attachment hole 521 (step S4).

When the user further tightens the attachment screw 71 into the attachment hole 521 in step S4, the attachment screw 71 moves toward the attachment hole 521 while the taper portion 713 slides on the inner edge of the insert hole 622. As a result, the fitting portion 714 is fit in the insert hole 622. The second connecting portions 62A and 62B are respectively held by the head portion 712 and the first connecting portions 52A and 52B.

In a state in which the fitting portion 714 is fit in the insert hole 622, since the insert hole 622 is formed by the circular hole and the fitting portion 714 has the columnar shape, as shown in FIG. 5, the first supporting member 5 is capable of rotating with respect to the second supporting member 6 with the pair of attachment screws 71 set as a rotation axis parallel to the X axis.

After step S4, the user adjusts the rotating position of the first supporting member 5 with respect to the second supporting member 6 (the projecting position of the first projector 2U) using the positioning holes 522A to 522D, the positioning insert holes 623A to 623D, and the positioning screw 72 (step S5).

For example, as shown in FIG. 6, the user inserts the positioning screw 72 through the positioning insert hole 623A (FIG. 5) and screws the positioning screw 72 into the positioning screw hole 522A (FIG. 13).

The positioning screw 72 is screwed in this way, whereby the rotation of the first supporting member 5 with respect to the second supporting member 6 is regulated.

Ceiling Suspension Setting

Figure 15:
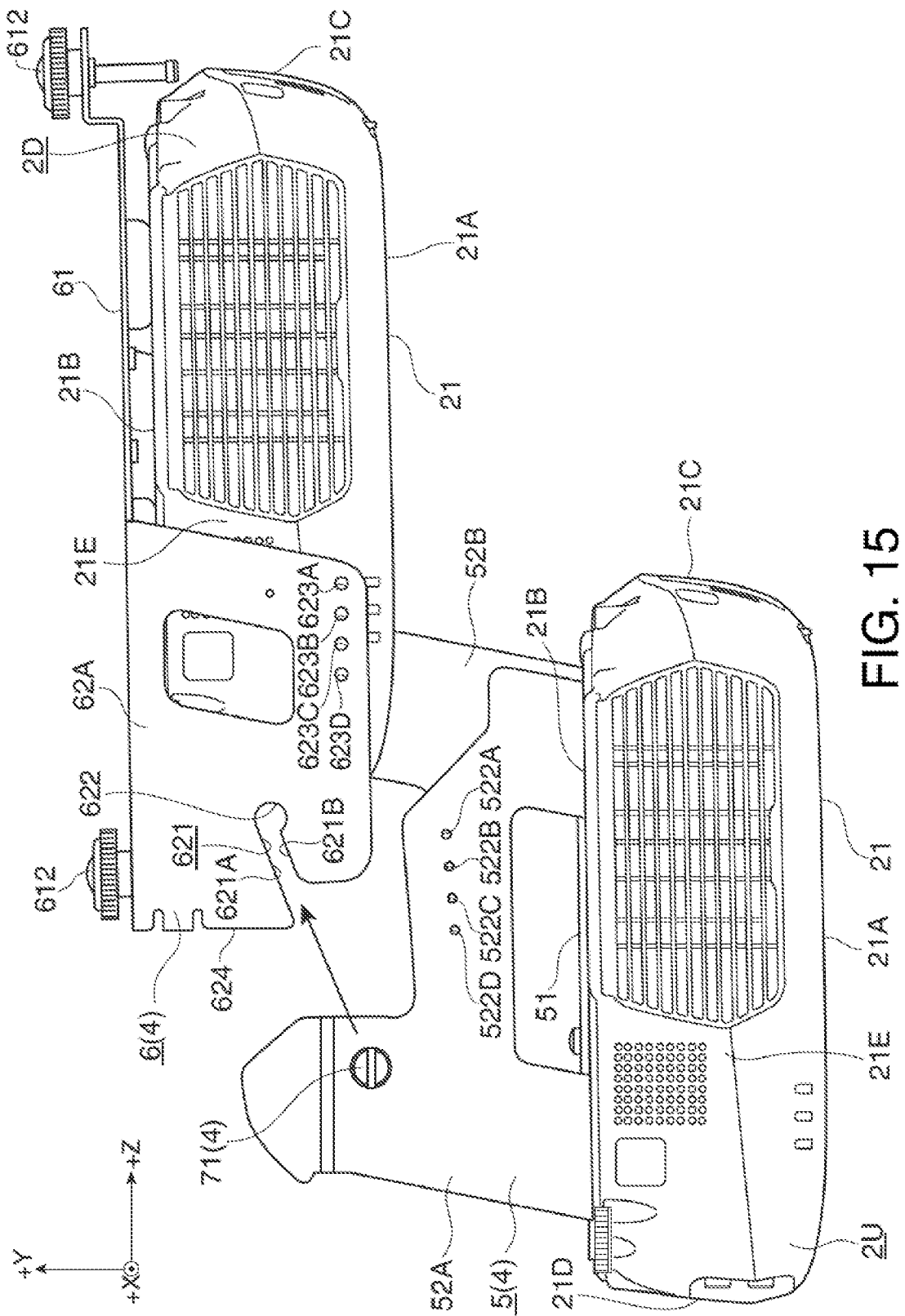
FIG. 15 is a diagram for explaining an assembly method for the support in the case of ceiling suspension setting in the embodiment of the invention.
Figure 16A:
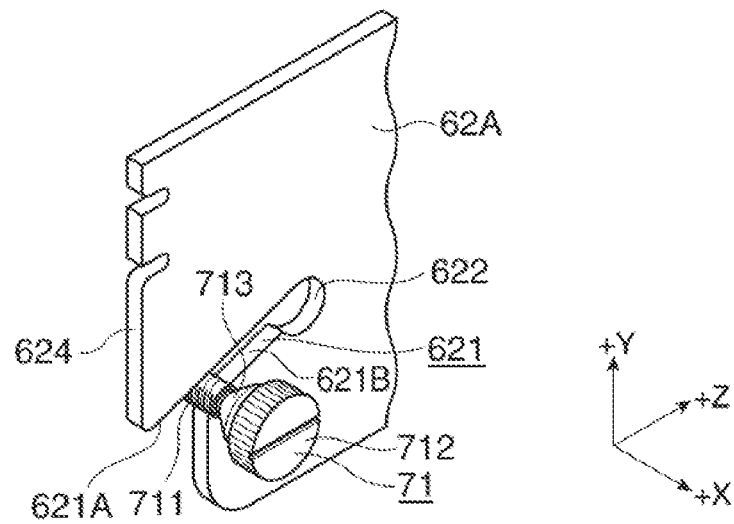
FIG. 16A is a diagram for explaining the assembly method for the support in the case of the ceiling suspension setting in the embodiment of the invention.
Figure 16B:
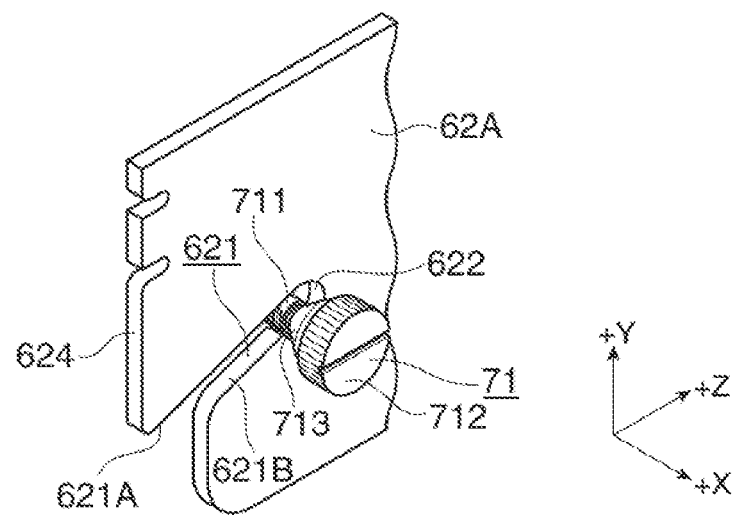
FIG. 16B is a diagram for explaining the assembly method for the support in the case of the ceiling suspension setting in the embodiment of the invention.
Figure 16C:
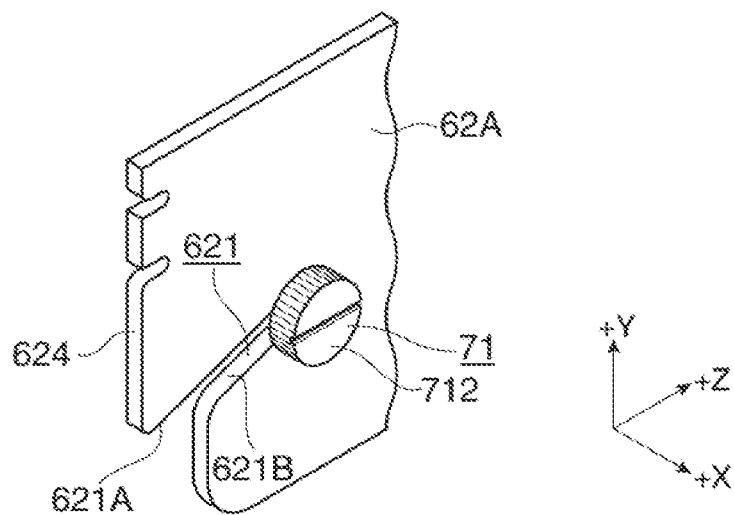
FIG. 16C is a diagram for explaining the assembly method for the support in the case of the ceiling suspension setting in the embodiment of the invention.

FIGS. 15 and 16C are diagrams for explaining the assembly method for the support 4 in the case of the ceiling suspension setting. Specifically, FIG. 15 is a diagram for explaining steps S1 and S2. In FIG. 15, a state in which the first supporting member 5 to which the first projector 2U is fixed and the second supporting member 6 to which the second projector 2D is fixed are disassemble is viewed from a side. FIGS. 16A to 16C are diagrams for explaining steps S2 to S4 and are enlarged perspective views of the second connecting portion 62A and the attachment screw 71.

The assembly method for the support 4 in the case of the ceiling suspension setting is substantially the same as the assembly method for the support 4 in the case of the normal placement setting. Therefore, only differences are explained below.

In the ceiling suspension setting, the user carries out step S2 as explained below.

As shown in FIG. 15, the user holds the first supporting member 5 by hand to locate the top surface 21A of the first projector 2U on the downward side with respect to the bottom surface 21B.

The user brings the first supporting member 5 closer to the second supporting member 6 from the downward side of the second supporting member 6 (the second projector 2D) suspended from the ceiling or the like and locates the pair of first connecting portions 52A and 52B between the pair of second connecting portions 62A and 62B.

As shown in FIG. 16A, as in the case of the normal placement setting, the user brings the shaft portion 711 of the attachment screw 71 into contact with the stepped portions of the end edges 624 on the −Z-axis side in the second connecting portions 62A and 62B.

In the ceiling suspension setting, the user carries out step S3 as explained below.

The user moves the first supporting member 5 (the shaft portion 711) from the downward side to the upward side along the inclining direction of the slit 621 until the attachment hole 521 opposes the insert hole 622. As shown in FIG. 16B, the user locates the shaft portion 711 in the insert hole 622.

In step S4, as shown in FIG. 16C, the user further tightens the attachment screw 71 into the attachment hole 521. Consequently, as in the case of the normal placement setting, the fitting portion 714 is fit in the insert hole 622 and the second connecting portions 62A and 62B are respectively held by the head portion 712 and the first connecting portions 52A and 52B.

According to this embodiment, there is an effect explained below.

In this embodiment, the support 4 includes the first and second supporting members 5 and 6 and the attachment screw 71.

Consequently, if the first and second projectors 2U and 2D are fixed to the first and second fixing portions 51 and 61 and the first and second connecting portions 52A and 62A (the first and second connecting portions 52B and 62B) are fixed to each other by the attachment screw 71, the second connecting portions 62A and 62B are held by the head 712 of the attachment screw 71 and the first connecting portions 52A and 52B. Therefore, it is possible to easily specify a relative positional relation between the first and second projectors 2U and 2D.

Therefore, it is possible to easily build the projection system 1 by using the support 4 when the projection system 1 including the first and second projectors 2U and 2D is built.

The insert holes 622 and the slits 621 are formed in the second connecting portions 62A and 62B. The taper portion 713 is provided in the attachment screw 71.

Consequently, in a state in which the attachment screw 71 is attached to the attachment hole 521 in advance in steps S1 to S5, the first supporting member 5 can be attached to the second supporting member 6. Therefore, it is possible to easily assemble the support 4.

The first supporting member 5 can be located in a desired position with respect to the second supporting member 6 by the taper portion 713. Therefore, it is possible to satisfactorily specify a relative positional relation between the first and second projectors 2U and 2D.

Further, the attachment screw 71 includes the fitting portion 714.

That is, the attachment screw 71 is further tightened into the attachment hole 521 in step S4, whereby the fitting portion 714 can be fit in the insert hole 622.

The first supporting member 5 is attached to the second supporting member 6 in a state in which the fitting portion 714 is fit in the insert hole 622. Therefore, the first supporting member 5 does not wobble with respect to the second supporting member 6. It is possible to stabilize an attached state of the first supporting member 5 to the second supporting member 6.

The pair of first and second connecting portions 52A and 52B and the pair of first and second connecting portions 62A and 62B are provided. Therefore, the first supporting member 5 can be attached to the second supporting member 6 on both the sides of the first and second fixing portions 51 and 61. Consequently, it is possible to further stabilize the attached state of the first supporting member 5 to the second supporting member 6.

Further, in the case of the normal placement setting, when the insert hole 622 and the slit 621 are seen in plan view, the insert hole 622 has a shape, a part of which protrudes to the upward side of the imaginary region VAr. In the case of the normal placement setting, the slit 621 has a shape inclining to the downward side from the end edge 624 on the −Z-axis side toward the position opposed to the attachment hole 521.

Consequently, in the case of the normal placement setting, when the shaft portion 711 is located in the insert hole 622 in step S3, since the slit 621 inclines to the downward side from the end edges 64 of the second connecting portions 62A and 62B toward the position opposed to the attachment hole 521. Therefore, it is possible to regulate, with the own weight of the first supporting member 5 and the first projector 2U, the movement of the shaft portion 711 (the first supporting member 5) from the insert hole 622 into the slit 621.

On the other hand, in the case of the ceiling suspension setting, contrary to the case of the normal placement setting, the insert hole 622 has the shape, a part of which protrudes to the downward side of the imaginary region VAr. Therefore, when the shaft portion 711 is located in the insert hole 622 in step S3, it is possible to regulate, with the own weight of the first supporting member 5 and the first projector 2U, the movement of the shaft portion 711 (the first supporting member 5) from the insert hole 622 into the slit 621.

Therefore, in both the cases of the normal placement setting and the ceiling suspension setting, if the shaft portion 711 (the attachment screw 71) is once located in the insert hole 622 in step S3, the movement of the first supporting member 5 can be regulated. Therefore, the user does not need to apply force to maintain a state in which the shaft portion 711 is located in the insert hole 622. That is, it is possible to more easily assemble the support 4.

Since the inclining direction of the slit 621 is set as explained above, when moving the shaft portion 711 (the first supporting member 5) along the slit 621 in step S3, the user can move the first supporting member 5 in a direction in which the second supporting member 6 is located.

That is, in the case of the normal placement setting, the second supporting member 6 is set on the downward side such as the floor.

Since the inclining direction of the slit 621 is set as explained above, in step S3, the user can move the first supporting member 5 from the upward side toward the second supporting member 6 located on the downward side along the slit 621.

In the case of the ceiling suspension setting, the second supporting member 6 is set on the upward side such as the ceiling.

Further, the inclining direction of the slit 621 is set as explained above, in step S3, the user can move the first supporting member 5 from the downward side toward the second supporting member 6 located on the upward side along the slit 621.

Therefore, in both the normal placement setting and the ceiling suspension setting, it is possible to easily incorporate the first supporting member 5 in the second supporting member 6 (step S3).

Further, when the insert hole 622 and the slit 621 are seen in plan view, the insert hole 622 is formed such that the tangential line of the insert hole 622 formed by the circular hole coincides with the lower edge 621A.

Consequently, in the insert hole 622 formed as explained above, a region of the part protruding to the outer side of the imaginary region VAr can be set large compared with the insert hole 622 formed to have the protruding parts respectively on both the sides of the imaginary region VAr.

Therefore, in the case of the ceiling suspension setting, when the shaft portion 711 is located in the insert hole 622 in step S3, it is possible to more surely regulate, with the part protruding to the outer side of the imaginary region VAr in the insert hole 622, the movement of the shaft portion 711 from the insert hole 622 into the slit 621.

Third Embodiment

In explanation of a third embodiment, explanation of contents and components same as those in the first and second embodiments is omitted. Only characteristic parts are explained below.

Configuration of the Support

Figure 17:
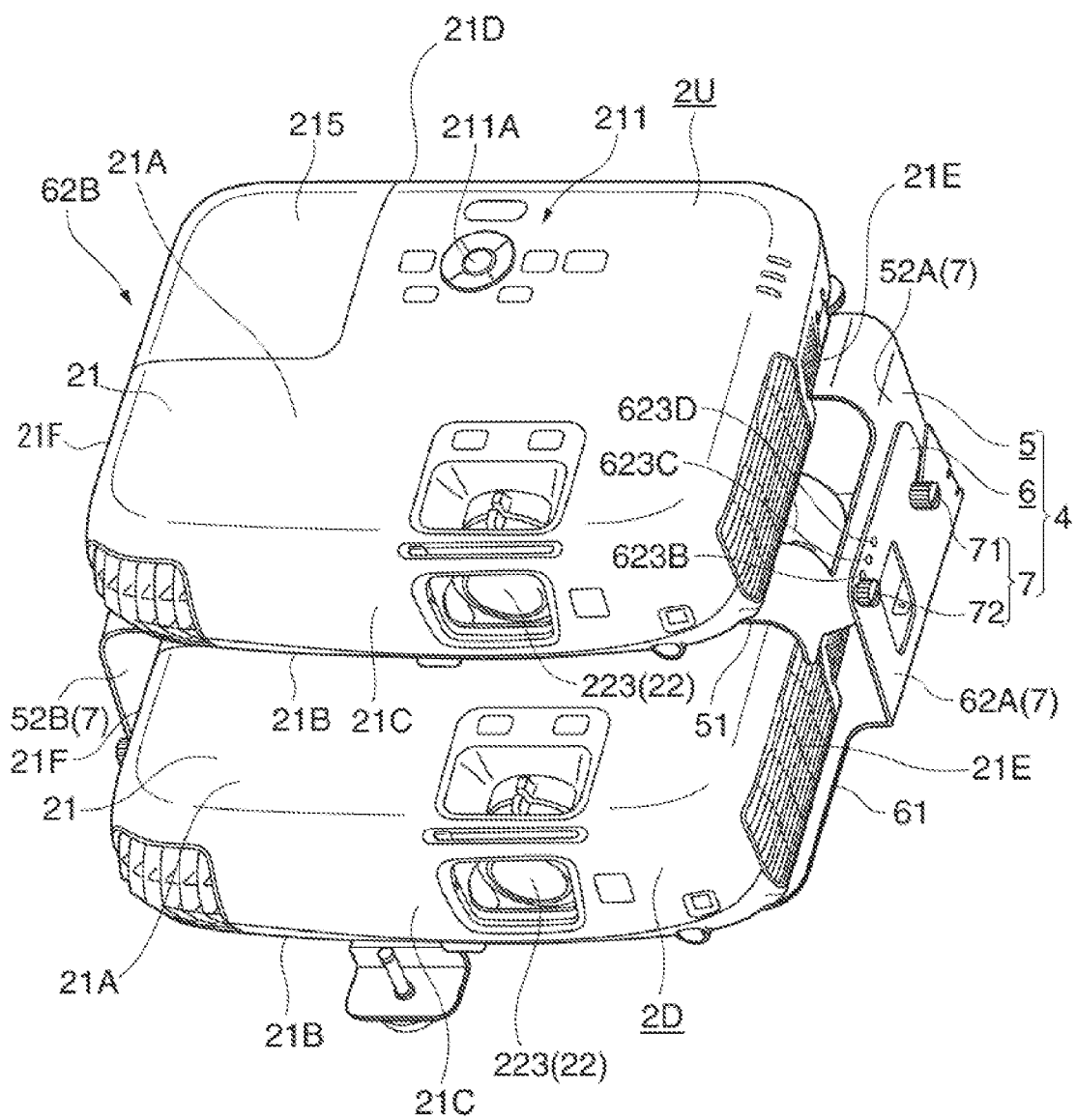
FIG. 17 is a diagram showing the configuration of a support in an embodiment of the invention.
Figure 18:
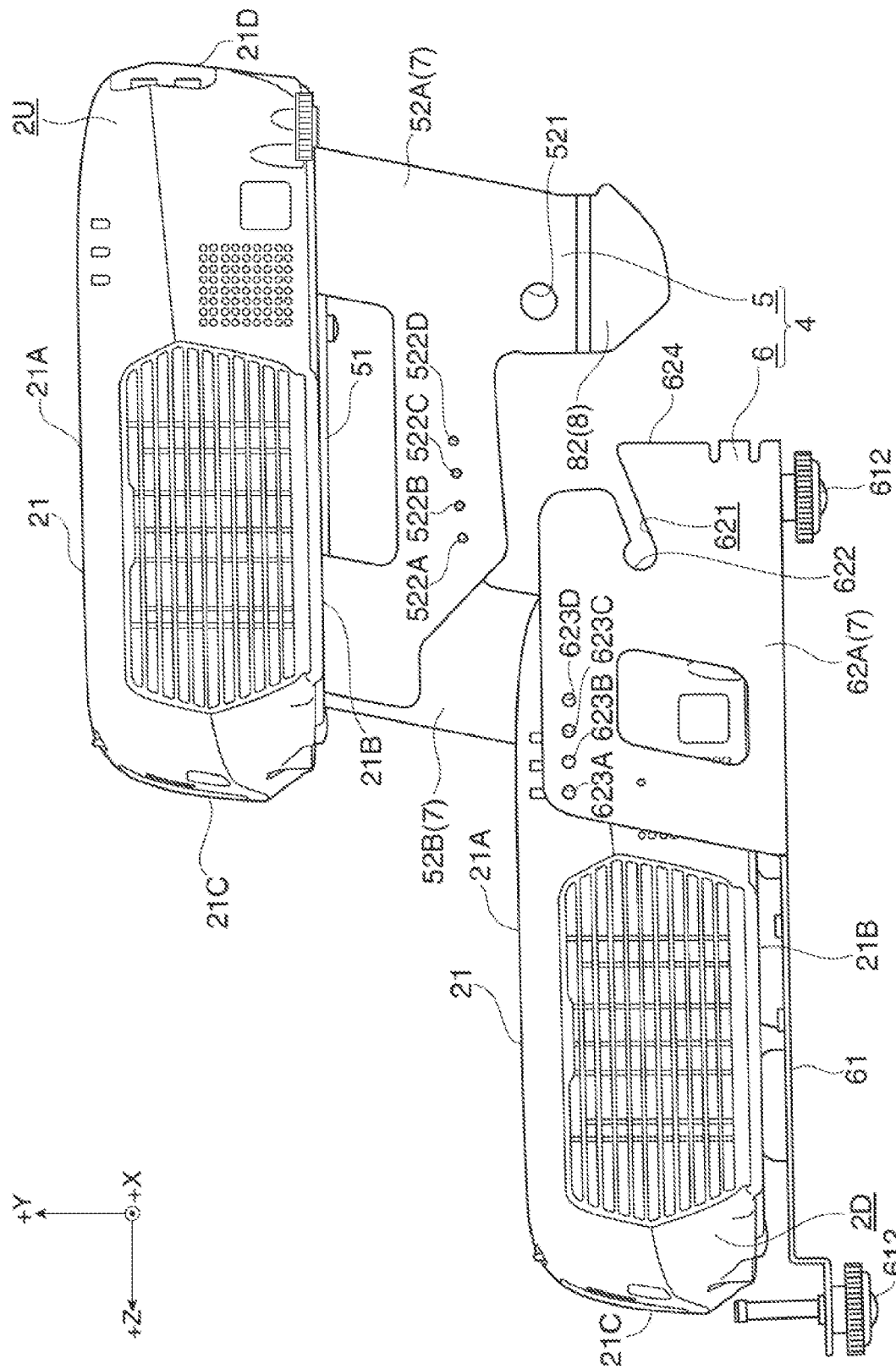
FIG. 18 is a diagram showing the configuration of the support in the embodiment of the invention.

FIGS. 17 and 18 are diagrams showing the configuration of the support 4 in this embodiment. Specifically, FIG. 17 is a front perspective view (on a projection side) of a state in which the first and second projectors 2U and 2D are supported by the support 4 and the first projector 2U is located in a first position. FIG. 18 is a side view of the support 4 in a disassembled state.

As shown in FIG. 17, the support 4 supports the first and second projectors 2U and 2D such that the first projector 2U is arranged on the top surface 21A side of the second projector 2D and the projection lenses 223 of the first and second projectors 2U and 2D face the same side.

Figure 19:
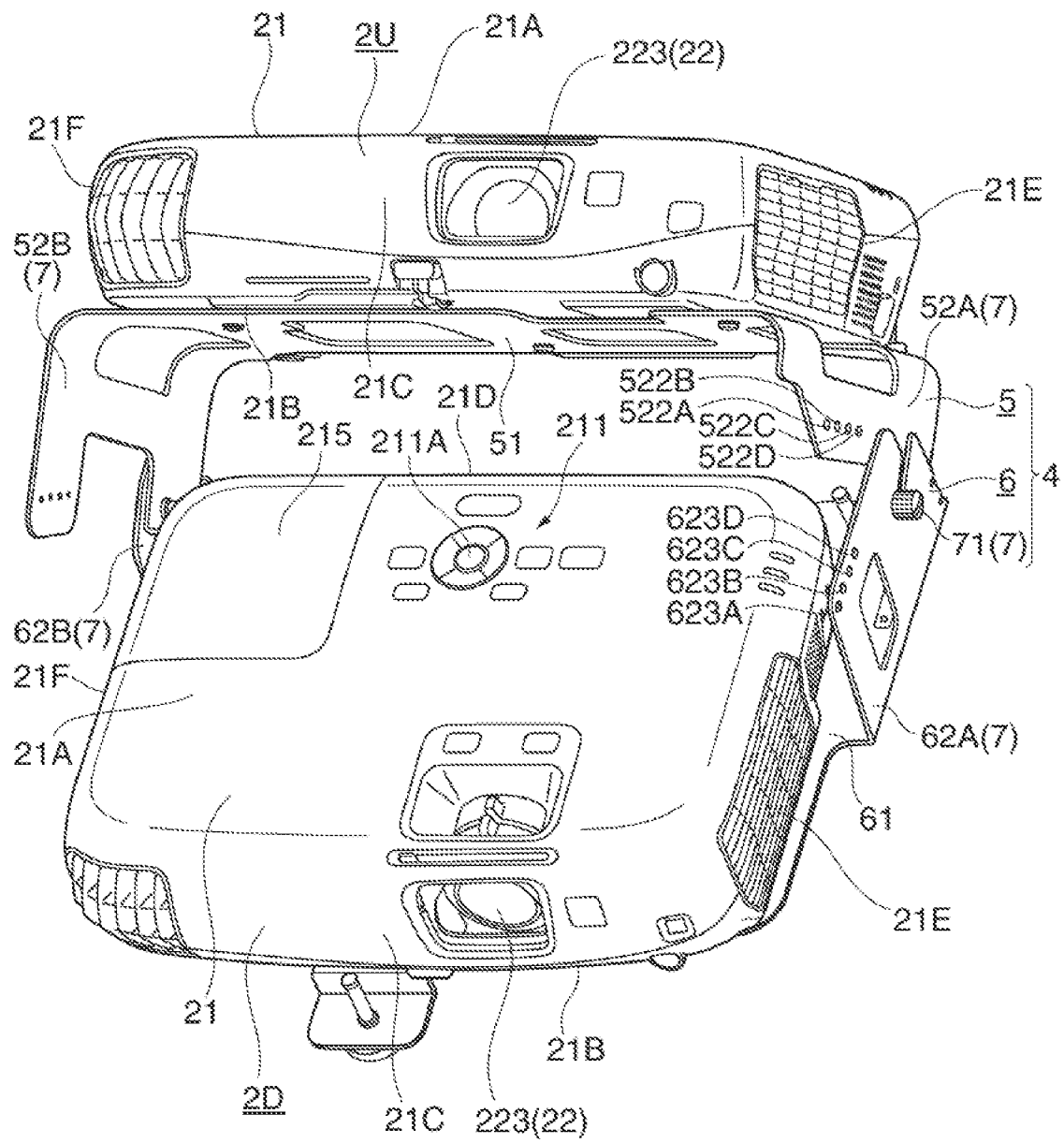
FIG. 19 is a diagram for explaining a function of a moving mechanism in the embodiment of the invention.
Figure 20:
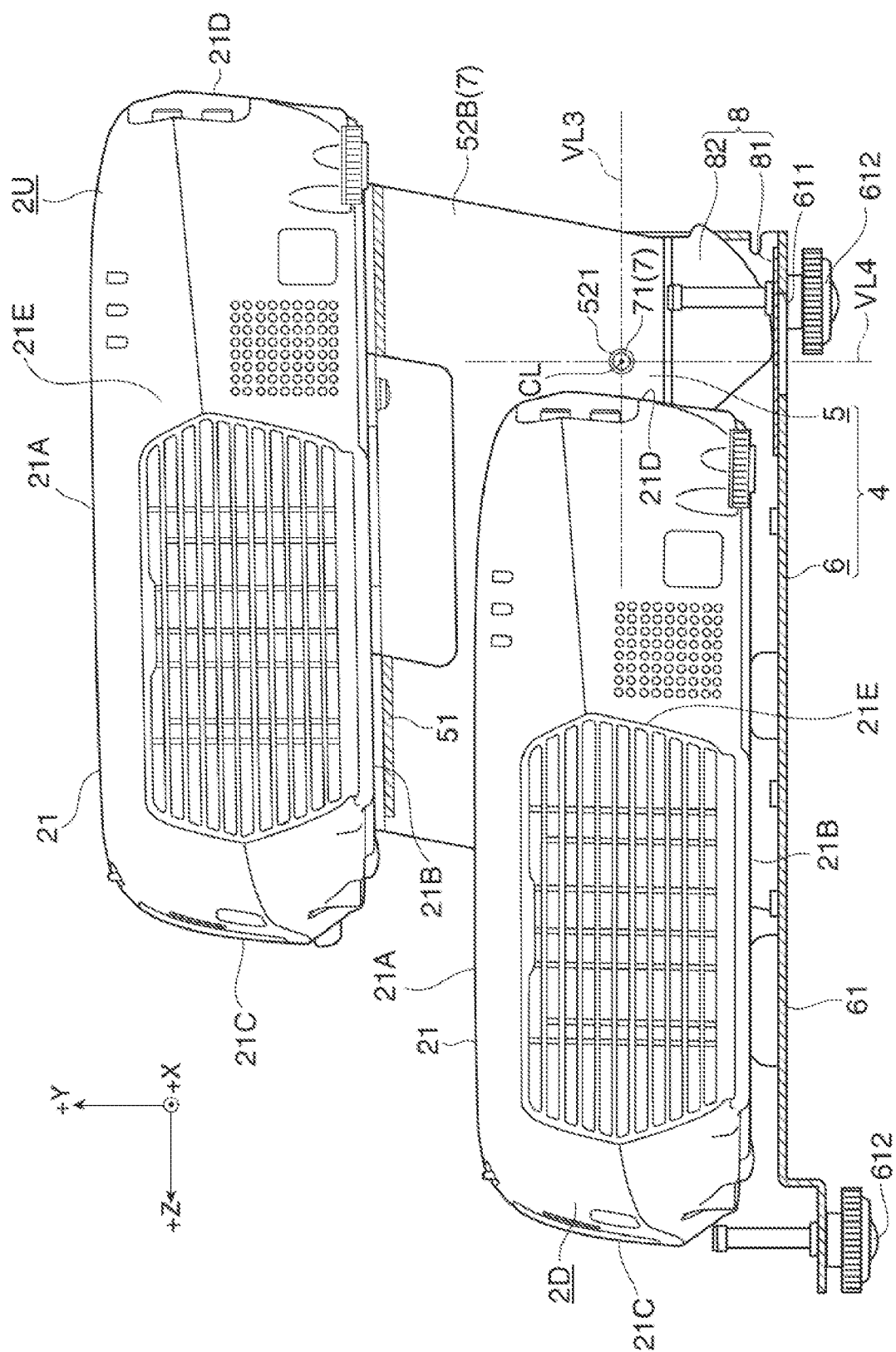
FIG. 20 is a diagram for explaining a disposing position of the attachment screw in the embodiment of the invention.
Figure 21:
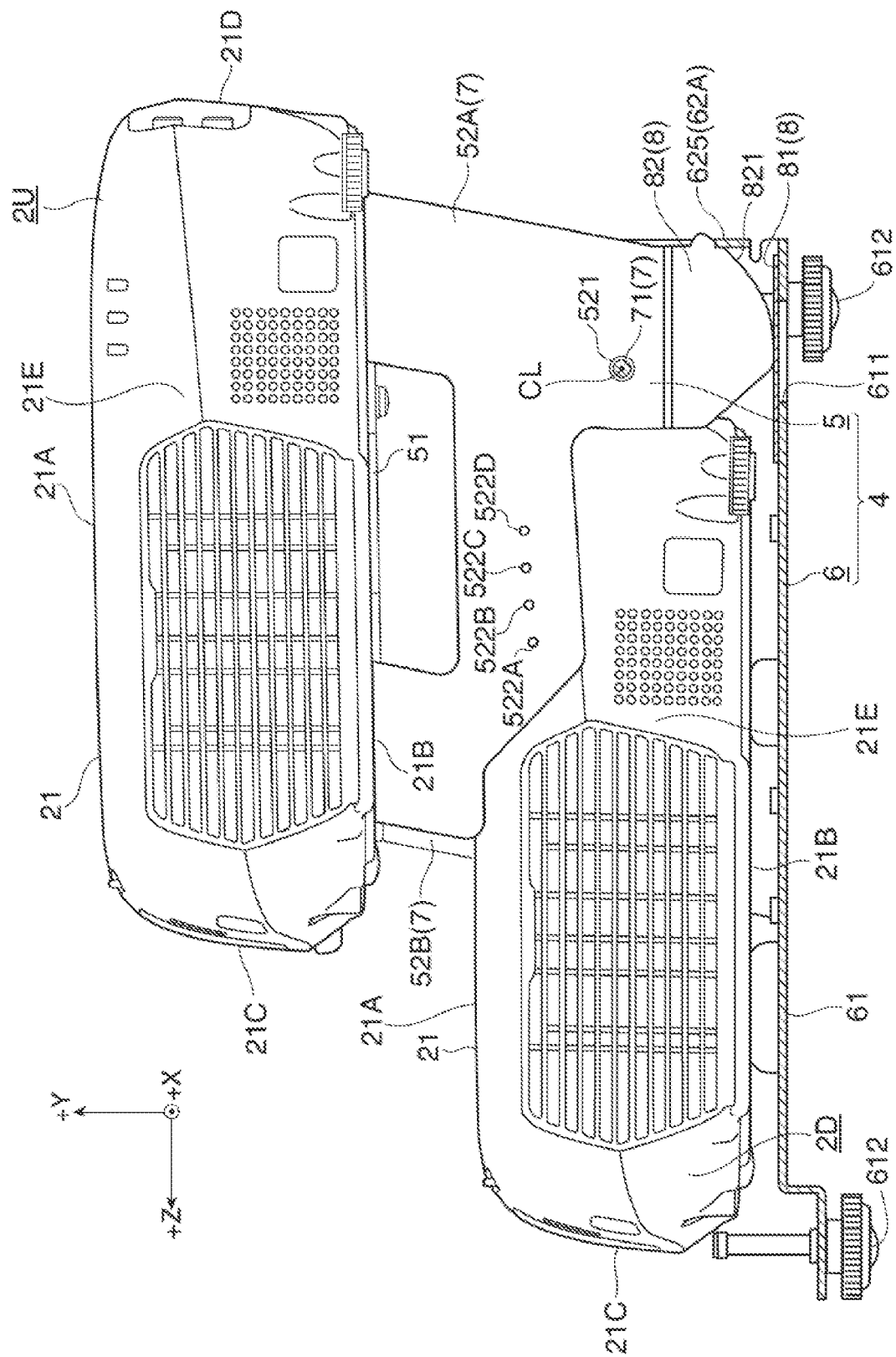
FIG. 21 is a diagram for explaining a function of a rotation suppressing mechanism in the embodiment of the invention.

The support 4 is configured to enable normal placement setting in which the first and second projectors 2U and 2D are set on a floor or a desk (a posture in which the top surfaces 21A of the first and second projectors 2U and 2D are located on the upward side with respect to the bottom surfaces 21B and the first projector 2U is located on the upward side of the second projector 2D) and ceiling suspension setting in which the first and second projectors 2U and 2D are vertically reversed from the normal placement setting and set on a ceiling or the like. FIGS. 17 and 18 illustrate the normal placement setting. FIGS. 19 to 21 also show the normal placement setting.

In the following explanation, for convenience of explanation, a projecting direction of an image from the second projector 2D is represented as Z axis (the projecting direction is represented as + and the opposite direction of the projecting direction is represented as −), a horizontal axis orthogonal to the Z axis is represented as X axis, and a vertical axis orthogonal to the Z axis is represented as Y axis (an upward side in the normal placement setting is represented as + and a downward side is represented as −) (FIGS. 17 to 18).

The support 4 supports the first and second projectors 2U and 2D.

The support 4 includes, as shown in FIGS. 17 to 18, the first supporting member 5, the second supporting member 6, a moving mechanism 7, and a rotation suppressing mechanism 8 (see FIGS. 21 and 22).

Configuration of the Moving Mechanism

FIG. 19 is a diagram for explaining a function of the moving mechanism 7. FIG. 19 is a front perspective view of a state in which the first and second projectors 2U and 2D are supported by the support 4 and the first projector 2U is located in a second position.

The moving mechanism 7 connects the first and second supporting members 5 and 6, relatively moves the first and second supporting members 5 and 6, and locates the first projector 2U in the first position (FIG. 17) or the second position (FIG. 19).

As shown in FIG. 17, the first position is a position where the bottom surface 21B of the first projector 2U is close to the top surface 21A of the second projector 2D and the first projector 2U covers a part of the top surface 21A (a portion on the −Z-axis side on the top surface 21A) of the second projector 2D. That is, in a state in which the first projector 2U is located in the first position, the first projector 2U is located in a position shifted to the −Z-axis side with respect to the second projector 2D.

As shown in FIG. 19, the second position is a position where the bottom surface 21B of the first projector 2U is spaced apart from the top surface 21A of the second projector 2D and uncovers the top surface 21A of the second projector 2D.

In this embodiment, as shown in FIG. 17 or 19, the moving mechanism 7 is configured to relatively rotate the first and second supporting members 5 and 6 to locate the first projector 2U in the first position or the second position.

The moving mechanism 7 includes, as shown in FIGS. 17 to 19, the pair of first connecting portions 52A and 52B provided in the first supporting member 5, the pair of second connecting portions 62A and 62B provided in the second supporting member 6, the pair of attachment screws 71, and the pair of positioning screws 72.

In this embodiment, in a state in which the first and second projectors 2U and 2D are respectively fixed to the first and second supporting members 5 and 6, the first supporting member 5 is assembled to the second supporting member 6 as explained below.

As a method of assembling the first supporting member 5 to the second supporting member 6, an assembly method in the case of the normal placement setting and an assembly method in the case of the ceiling suspension setting (a posture in which the top surfaces 21A of the first and second projectors 2U and 2D are located on the downward side with respect to the bottom surfaces 21B (a posture in which the first supporting member 5 is located on the downward side with respect to the second supporting member 6 suspended from the ceiling or the like)) are conceivable.

That is, in the case of the normal placement setting, the first supporting member 5 is assembled to the second supporting member 6 set on the floor or the like.

In the case of the ceiling suspension setting, the first supporting member 5 is assembled to the second supporting member 6 suspended from the ceiling or the like.

In both the cases of the normal placement setting and the ceiling suspension setting, the methods of assembling the first supporting member 5 to the second supporting member 6 are substantially the same. Therefore, only the assembly method in the case of the normal placement setting is explained.

First, a user screws the pair of attachment screws 71 respectively into the pair of attachment holes 521 in a loosened state in advance.

Subsequently, the user holds the first supporting member 5 (the first projector 2U) by hand and brings the first supporting member 5 closer to the second supporting member 6 set on the floor or the like to locate the pair of first connecting portions 52A and 52B between the pair of second connecting portions 62A and 62B. The user puts the shaft portions 711 of the pair of attachment screws 71 in forming positions of the slits 621 of the end edges 624 on the −Z-axis side in the pair of second connecting portions 62A and 62B.

The user moves the first supporting member 5 (the shaft portion 711) along the slit 621 and locates the shaft portion 711 in the insert hole 622.

Finally, the user further tightens the attachment screw 71 into the attachment hole 521.

When the user further tightens the attachment screw 71 into the attachment hole 521, the attachment screw 71 moves toward the attachment hole 521 while the taper portion 713 slides on the inner edge of the insert hole 622. As a result, the fitting portion 714 is fit in the insert hole 622.

As explained above, the pair of attachment holes 521 is formed in the positions opposed to each other along the X-axis direction. Therefore, in a state in which the pair of attachment screws 71 is screwed into the pair of attachment holes 521, the center lines CL of the pair of attachment screws 71 coincide with each other. The insert hole 622 is formed by the circular hole. Further, the fitting portion 714 has the columnar shape. Therefore, in a state in which the fitting portion 714 is fit in the insert hole 622, as shown in FIG. 17 or 19, the pair of attachment screws 71 functions as a rotation axis. The first supporting member 5 rotates about the center line CL with respect to the second supporting member 6 set on the floor or the like.

FIG. 20 is a diagram for explaining a disposing position of the attachment screw 71. Specifically, FIG. 20 is a sectional view of a unit shown in FIG. 17 (a unit of the first and second projectors 2U and 2D integrated by the support 4) taken along a YZ plane that passes between the first connecting portion 52A and the first and second projectors 2U and 2D.

As shown in FIG. 20, the pair of attachment screws 71 (the attachment holes 521) is disposed such that the center line CL is orthogonal to a direction extending along the projecting direction of the second projector 2D (the Z-axis direction) (a first imaginary line LV3 direction) and a direction extending along the thickness direction of the second projector 2D (the direction from the top surface 21A toward the bottom surface 21B (the Y-axis direction)) (a second imaginary line VL4 direction).

The pair of attachment screws 71 is disposed to be located on the −Z-axis side with respect to the second projector 2D, that is, on the −Z-axis side of the rear surface 21D of the second projector 2D.

Configuration of the Rotation Suppressing Mechanism

Figure 22A:
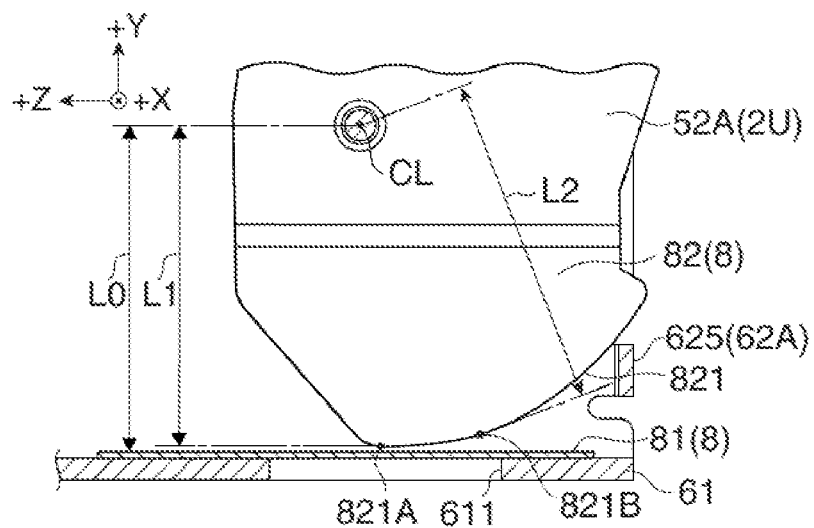
FIG. 22A is a diagram for explaining the function of the rotation suppressing mechanism in the embodiment of the invention.
Figure 22B:
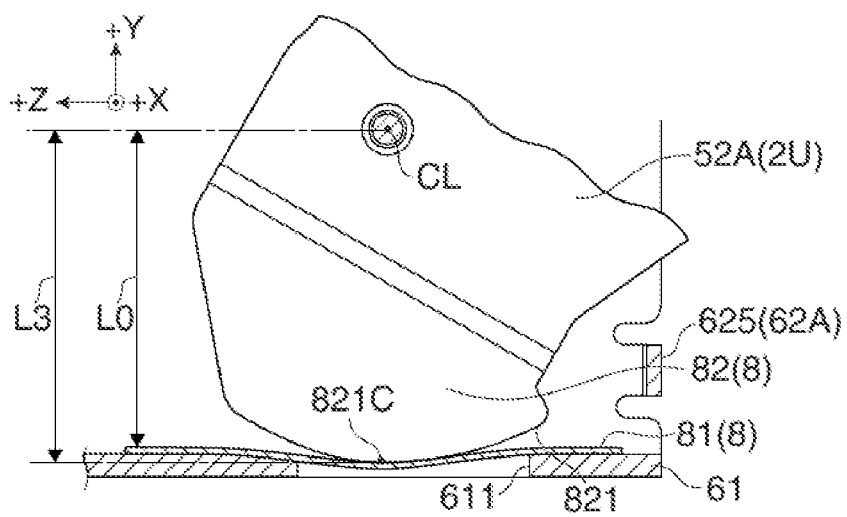
FIG. 22B is a diagram for explaining the function of the rotation suppressing mechanism in the embodiment of the invention.
Figure 22C:
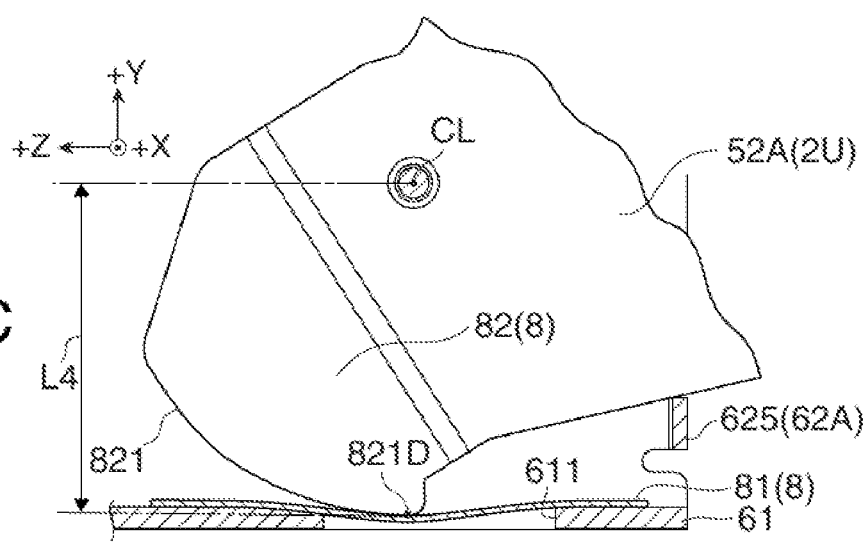
FIG. 22C is a diagram for explaining the function of the rotation suppressing mechanism in the embodiment of the invention.

FIGS. 21 to 22C are diagrams for explaining a function of the rotation suppressing mechanism 8. Specifically, FIG. 21 is a sectional view of the unit shown in FIG. 17 taken along the YZ plane that passes between the first and second connecting portions 52A and 62A. FIGS. 22A to 22C are enlarged view of a part of the unit shown in FIG. 21 and show a positional relation between an urging member 81 and a contact portion 82. More specifically, FIG. 22A shows a state in which the first projector 2U is located in the first position. FIG. 22C shows a state in which the first projector 2U is located in the second position. FIG. 22B shows a state in which the first projector 2U is located between the first and second positions.

The rotation suppressing mechanism 8 suppresses the rotation of the first supporting member 5 with respect to the second supporting member 6.

The rotation suppressing mechanism 8 includes, as shown in FIGS. 21 to 22C, a pair of urging members 81 and a pair of contact portions 82.

Although not specifically shown in the figures, the pair of urging members 81 and the pair of contact portions 82 are respectively disposed on the left side and the right side in FIG. 17 with respect to the second projector 2D.

In FIGS. 21 to 22C, only the urging member 81 and the contact portion 82 disposed on the right side in FIG. 17 with respect to the second projector 2D are shown.

The pair of urging members 81 has the same shape. The pair of contact portions 82 also has the same shape. Therefore, the urging member 81 and the contact portion 82 disposed on the right side in FIG. 17 with respect to the second projector 2D are mainly explained with reference to FIGS. 21 to 22C.

As shown in FIGS. 21 to 22C, the urging member 81 is configured by a leaf spring extending along the Z-axis direction.

The urging member 81 is attached to a plate surface of the second fixing portion 61 by screws (not shown in the figures).

In the second fixing portion 61, as shown in FIGS. 21 to 22C, a long hole 611 extending along the Z-axis direction is formed in an attaching position of the urging member 81.

Although not specifically shown in the figure, in the second fixing portion 61, long holes 611 are respectively formed on both the left and right sides in FIG. 17 with respect to the second projector 2D to correspond to the pair of urging members 81.

As shown in FIGS. 21 to 22C, the long hole 611 is formed such that the length dimension in the Z-axis direction thereof is smaller than the length dimension in the Z-axis direction of the urging member 81. Although not specifically shown in the figures, the long hole 611 is formed such that the width dimension in the X-axis direction thereof is larger than the width dimension in the X-axis direction of the urging member 81.

That is, the long hole 611 is formed in the second fixing portion 61, whereby the urging member 81 is set to bend toward the inside of the long hole 611 when being pressed from the upward side in FIGS. 21 to 22C.

The pair of contact portions 82 is respectively provided at end edges on the downward side (end edges on the second fixing portion 61 side) in FIGS. 21 to 22C in the first connecting portions 52A and 52B. The pair of contact portions 82 respectively comes into contact with the pair of urging members 81 according to the relative rotation of the first and second supporting members 5 and 6.

Specifically, like the first connecting portions 52A and 52B, the pair of contact portions 82 is respectively configured by plate bodies parallel to the YZ plane and provided in positions offset to the second projector 2D side with respect to the first connecting portions 52A and 52B.

In the contact portion 82, a substantially arcuate contact surface 821 that comes into contact with the urging member 81 according to the relative rotation of the first and second supporting members 5 and 6 is provided at the end edge on the downward side in FIGS. 21 to 22C.

The contact surface 821 includes an end portion 821A and first to third contact positions 821B to 821D sequentially provided from the +Z-axis side toward the −Z-axis side.

The end portion 821A is a region located most on the −Y-axis side in the first position. The end portion 821A is set such that a length dimension L1 from the center line CL is smaller than a length dimension L0 from the center line CL to the upper surface of the urging member 81 as shown in FIG. 22A.

The first contact position 821B located on the −Z-axis side of the end portion 821A is set such that a length dimension L2 (FIG. 22B) from the center line CL is the same as the length dimension L0.

That is, the contact surface 821 is formed such that the length dimension from the center line CL gradually increases from the length dimension L1 to the length dimension L2 in the end portion 821A to the first contact position 821B.

Further, the second contact position 821C located on the −Z-axis side of the first contact position 821B is set such that a length dimension L3 from the center line CL is larger than the length dimension L0 as shown in FIG. 22B.

That is, the contact surface 821 is formed such that the length dimension from the center line CL gradually increases from the length dimension L2 to the length dimension L3 in the first contact position 821B to the second contact position 821C.

The third contact position 821D located on the −Z-axis side of the second contact position 821C is formed such that a length dimension L4 (FIG. 22C) from the center line CL is the same as the length dimension L3.

That is, the contact surface 821 is formed in an arcuate shape centering on the center line CL in the second contact position 821C to the third contact position 821D.

The operation of the rotation suppressing mechanism 8 is explained.

In the state in which the first projector 2U is located in the first position, as explained above, from a relation between the length dimensions L0 and L1 (L0<L1), the contact surface 821 is not in contact with the urging member 81 (FIG. 22A).

When the first supporting member 5 is rotated with respect to the second sporting member 6 from the state shown in FIG. 22A, the contact portion 82 also rotates according to the rotation of the first supporting member 5.

That is, according to the rotation of the contact portion 82, a region located most on the −Y-axis side on the contact surface 821 changes from the end portion 821A to the first to third contact positions 821B to 821D in this order.

First, when the region located most on the −Y-axis side on the contact surface 821 changes from the end portion 821A to the first contact position 821B, since the length dimension L2 is set the same as the length dimension L0, the contact surface 821 comes into contact with the urging member 81.

Since the length dimension L3 is set larger than the length dimension L0, while the region located most on the −Y-axis side on the contact surface 821 changes from the first contact position 821B to the second contact position 821C, the contact surface 821 starts to press the urging member 81 from the upward side as shown in FIG. 22B. When pressed by the contact portion 821, the urging member 81 bends toward the inside of the long hole 611 as shown in FIG. 22B.

Since the length dimension L4 is set the same as the length dimension L3, while the region located most on the −Y-axis side on the contact surface 821 changes from the second contact position 821C to the third contact position 821D, the contact surface 821 continues to press the urging member 81 from the upward side with a fixed pressing force as shown in FIG. 22C.

In the second connecting portions 62A and 62B, as shown in FIGS. 21 to 22C, rotation regulating portions 625 projecting to the second projector 2D side are respectively provided at the end edges 624 on the −Z-axis side.

When the region located most on the −Y-axis side on the contact surface 821 changes from the second contact position 821C to the third contact position 821D, the first connecting portions 52A and 52B come into contact with the rotation regulating portions 625 as shown in FIG. 22C. That is, the rotation of the first supporting member 5 with respect to the second supporting member 6 is regulated. The first projector 2U is located in the second position.

In the state shown in FIG. 22C, center of gravity positions of the first supporting member 5 and the first projector 2U are located on the −Z-axis side with respect to the center line CL and an urging force is applied to the contact portion 82 by the urging member 81. Therefore, the first projector 2U maintains a state in which the first projector 2U is located in the second position.

According to this embodiment, there is an effect explained below.

In this embodiment, the support 4 includes the first and second supporting members 5 and 6 and the moving mechanism 7.

Consequently, the user fixes the first and second projectors 2U and 2D to the first and second supporting members 5 and 6 and relatively moves (rotates) the first and second supporting members 5 and 6 with the moving mechanism 7. By moving (rotating) the first and second supporting members 5 and 6 in this way, it is possible to locate the first projector 2U in the first position where the first projector 2U covers a part of the top surface 21A of the second projector 2D.

It is possible to perform stack projection by causing the first and second projectors 2U and 2D to operate in a state in which the first projector 2U is located in the first position.

That is, it is possible to easily specify a relative positional relation between the first and second projectors 2U and 2D simply by fixing the first and second projectors 2U and 2D to the first and second supporting members 5 and 6 and locating the first projector 2U in the first position with the moving mechanism 7.

Therefore, when the projection system 1 including the first and second projectors 2U and 2D is built, it is possible to easily build the projection system 1 by using the support 4.

In this embodiment, by relatively moving the first and second supporting members 5 and 6 with the moving mechanism 7, it is possible to locate the first projector 2U in the second position where the first projector 2U is spaced apart from the top surface 21A of the second projector 2D and uncovers the top surface 21A.

That is, when the stack projection is performed, the first projector 2U is located in the first position. When the stack projection is not performed, the first projector 2U is located in the second position.

The first projector 2U is located in the second position when the stack projection is not performed in this way, whereby the top surface 21A of the second projector 2D is uncovered. Therefore, it is possible to allow the user to operate the operation panel 211 (FIG. 19) provided on the top surface 21A of the second projector 2D and including the power button 211A (FIG. 19). Further, it is possible to allow the user to attach and detach the lamp lid 215 (FIG. 19) provided on the top surface 21A of the second projector 2D and used for replacing a light source lamp (not shown in the figure) on the inside.

The uncovered state is maintained concerning the top surface 21A of the first projector 2U. Therefore, in both of the state in which the first projector 2U is located in the first position and the state in which the first projector 2U is located in the second position, it is possible to allow the user to operate the operation panel 211 (FIG. 17) and attach and detach the lamp lid 215 (FIG. 17) in the first projector 2U.

The first projector 2U is located in the second position as explained above, whereby operability and maintainability of the second projector 2D are secured. Therefore, when the stack projection is performed (when the first projector 2U is located in the first position), it is possible to set the first and second projectors 2U and 2D in an adjacent state.

That is, when the stack projection is performed, it is possible to compactly integrate the first and second projectors 2U and 2D and the support 4 as a unit.

Further, the moving mechanism 7 relatively rotates the first and second supporting members 5 and 6 about the center line CL orthogonal to the first and second imaginary lines VL3 and VL4.

Consequently, by relatively rotating the first and second supporting members 5 and 6 with the moving mechanism 7, it is possible to adjust the position (a projecting position) of an image projected on the screen Sc from the first projector 2U and superimpose the image on an image projected on the screen Sc from the second projector 2D.

Therefore, it is possible to adjust the projecting position while securing maintainability of the first and second projectors 2U and 2D with the moving mechanism 7. Consequently, it is possible to realize improvement of convenience.

The pair of attachment screws 71 is disposed on the −Z-axis side with respect to the second projector 2D. Therefore, it is possible to set the first and second projectors 2U and 2D in an adjacent state in a state in which the first projector 2U is located in the first position.

That is, even if the first and second projectors 2U and 2D are set in the adjacent state as explained above, it is possible to relatively rotate the first and second supporting members 5 and 6 and locate the first projector 2U in the second position while preventing mechanical interference of the first and second projectors 2U and 2D.

Therefore, when the stack projection is performed, it is possible to compactly integrate the first and second projectors 2U and 2D and the support 4 as a unit.

Further, by disposing the pair of attachment screws 71 in the positions explained above, when the first supporting member 5 is rotated with respect to the second supporting member 6 from the state in which the first projector 2U is located in the first position to the state in which the first projector 2U is located in the second position, it is possible to place the rear surfaces 21D (FIG. 20) of the first and second projectors 2U and 2D adjacent to each other.

Therefore, for example, there is an effect explained below when connection terminals (not shown in the figure) provided on the rear surfaces 21D of the first and second projectors 2U and 2D are connected by a signal cable (not shown in the figure) in order to transmit and receive a signal between the first and second projectors 2U and 2D.

That is, even when the first supporting member 5 is rotated with respect to the second supporting member 6, it is possible to satisfactorily maintain a connection state of the connection terminals and the signal cable. Further, it is unnecessary to use a long signal cable.

The support 4 includes the rotation suppressing mechanism 8 including the urging member 81 configured to maintain the position (the second position) of the first projector 2U with an urging force.

Consequently, in the case of the normal placement setting, it is possible to prevent the first supporting member 5 from rotating with respect to the second supporting member 6 with the own weight of the first projector 2U and the first supporting member 5 in a direction in which the first projector 2U returns to the first position.

Therefore, in the case of the normal placement setting, it is possible to allow the user to satisfactorily operate the operation panel 211 and attach and detach the lamp lid 215 in the second projector 2D in the state in which the first projector 2U is located in the second position.

Further, the rotation suppressing mechanism 8 includes the contact portion 82 besides the urging member 81.

In the contact portion 82, the length dimensions L1 to L4 from the center line CL to the end portion 821A and the first to third contact positions 821B to 821D are set as explained above.

Consequently, as the first and second supporting members 5 and 6 relatively rotate from the state in which the first projector 2U is located in the first position to the state in which the first projector 2U is located in the second position, a pressing force from the contact portion 82 to the urging member 81 increases. In other words, as the first and second supporting members 5 and 6 rotate as explained above, a friction force between the contact portion 82 and the urging member 81 increases.

That is, the rotation suppressing mechanism 8 functions as a brake mechanism for the first and second supporting members 5 and 6 that rotate as explained above.

Therefore, in the case of the ceiling suspension setting, when the first projector 2U is located from the first position to the second position, it is possible to suppress the first supporting member 5 from suddenly rotating with respect to the second supporting member 6.

The pair of first connecting portions 52A and 52B and the pair of second connecting portions 62A and 62B and the pair of the attachment screws 71 included in the moving mechanism 7 are provided. Therefore, it is possible to attach the first supporting member 5 to the second supporting member 6 on both the sides of the first and second fixing portions 51 and 61.

Therefore, it is possible to stabilize an attached state of the first supporting member 5 to the second supporting member 6 and satisfactorily rotate the first supporting member 5 with respect to the second supporting member 6.

The invention is not limited to the embodiments explained above. Modifications, improvements, and the like within a range in which the objects of the invention can be attained are included in the invention.

In the embodiment, the image for the left eye is projected from the first projector 2U with the first linearly polarized light and the image for the right eye is projected from the second projector 2D with the second linearly polarized light. That is, the projection system 1 allows the observer to stereoscopically view the projected image PF using the first and second linearly polarized lights. However, the projection system 1 is not limited to this.

For example, the projection system 1 may adopt a configuration for allowing the observer to stereoscopically view a projected image using counterclockwise circularly polarized light and clockwise circularly polarized light.

When the projection system 1 is configured in this way, to correspond to the configuration, the polarized glasses 3 are configured such that the transmitting portion for left eye 31 transmits only one of the counterclockwise circularly polarized light and the clockwise circularly polarized light and the transmitting portion for right eye 32 transmits only the other.

In the embodiments, the projection system 1 is configured by the 3D projection system. However, the projection system 1 is not limited to this. The projection system 1 may adopt a configuration in which the polarized glasses 3 are omitted and the same image is projected from the first and second projectors 2U and 2D.

In the first embodiment, the support 4 supports the first and second projectors 2U and 2D such that the first and second projectors 2U and 2D are provided in parallel along the thickness direction. However, the support 4 is not limited to this. The support 4 may support the first and second projectors 2U and 2D such that the first and second projectors 2U and 2D are provided in parallel, for example, in the X-axis direction as long as the projection distances of the first and second projectors 2U and 2D are different.

In the first embodiment, the support 4 is configured to support the two first and second projectors 2U and 2D. However, the support 4 is not limited to this. The support 4 may be configured to support three or more projectors.

Even when the support 4 is configured to support the three or more projectors, as in the embodiments, the support is desirably configured to support the three or more projectors in a state in which projection distances of at least two projectors are different.

In the second embodiment, the insert hole 622 is formed to have the portion protruding to only one side of both the sides across the imaginary region VAr when the insert hole 622 and the slit 621 are seen in plan view. However, the insert hole 622 is not limited to this. The insert hole 622 may be formed to have protruding portions respectively on both the sides.

In the second embodiment, the first and second fixing portions 51 and 61 are configured such that the bottom surfaces 21B of the first and second projectors 2U and 2D are fixed. However, the first and second fixing portions 51 and 61 are not limited to this.

For example, the first and second fixing portions according to the embodiment of the invention may be configured such that the top surfaces 21A, the rear surfaces 21D, or the side surfaces 21E and 21F of the first and second projectors 2U and 2D are fixed.

In the second embodiment, the first and second connecting portions 52A, 52B, 62A, and 62B are configured to be located on the left and right side surface sides of the second projector 2D. However, the first and second connecting portions 52A, 52B, 62A, and 62B are not limited to this. The first and second connecting portions 52A, 52B, 62A, and 62B may be configured to be located in other positions, for example, on the rear surface side of the second projector 2D.

In the second embodiment, in the case of the normal placement setting, the first projector 2U is configured to be located on the upward side of the second projector 2D by the support 4. However, the support 4 may be configured such that a positional relation between the first and second projectors 2U and 2D are other positional relations.

In the second embodiment, the support 4 is configured to incorporate the first supporting member 5, in which the attachment screw 71 is screwed, in the second supporting member 6, in which the slit 621 is formed. However, the support 4 may be configured to incorporate the second supporting member 6 in the first supporting member 5, into which the attachment screw 71 is screwed. That is, in the normal placement setting, the support 4 may be configured such that the second projector 2D is supported on the upward side of the first projector 2U. Further, the support 4 may be configured such that the first supporting member 5 can be set on the ceiling or the like.

In the third embodiment, the moving mechanism 7 relatively rotates the first and second supporting members 5 and 6 to locate the first projector 2U in the first position or the second position. However, the moving mechanism 7 is not limited to this. The moving mechanism according to the embodiment of the invention may adopt other configurations, for example, a configuration for sliding the first supporting member 5 with respect to the second supporting member 6 as long as the moving mechanism locate the first projector 2U in the first position where the first projector 2U covers at least a part of the top surface 21A of the second projector 2D or the second position where the first projector 2U uncovers the top surface 21A of the second projector 2D.

In the third embodiment, the urging member 81 included in the rotation suppressing mechanism 8 is configured by the leaf spring. However, the urging member 81 is not limited to this. Other members, for example, an elastic member such as rubber or sponge may be adopted as long as the members change a friction force between the members and the contact portion 82.

In the third embodiment, the urging member 81 is provided in the second supporting member 6 and the contact portion 82 is provided in the first supporting member 5. However, the urging member 81 and the contact portion 82 are not limited to this. The urging member 81 may be provided in the first supporting member 5 and the contact portion 82 may be provided in the second supporting member 6.

What is claimed is:

1. A projection system including a first projector and a second projector and that superimposes an image projected on the projection surface from one projector, the projection distance of which is long, of the first projector and the second projector with reference to an image projected on the projection surface from another projector of the first projector and the second projector, the projection distance of which is short, the projection system comprising:
   a support configured to support the first projector and the second projector,
   wherein
      the support supports the first projector and the second projector in positions where projection distances from the first projector and the second projector to the projection surface are different,
      the first projector projects a first calibration image and the second projector projects a second calibration image, the first calibration image and the second calibration image each including an image of an outline,
      an imaging device of one projector of the first projector and the second projector captures an image of the first calibration image and the second calibration image projected on the projection surface, and
      a control unit of the one projector of the first projector and the second projector applies size correction to the first calibration image or the second calibration image based on the captured image to compensate for different projection distances of the first projector and the second projector such that the outline of the first calibration image overlaps the outline of the second calibration image after the size correction.

2. The projection system according to claim 1, wherein the support supports the first projector and the second projector in positions where the first projector and the second projector are arranged along a thickness direction.

3. The projection system according to claim 2, wherein
   the first projector is supported by the support in a position where the first projector covers a part of a top surface of the second projector,
   the second projector includes an operation portion for operating the second projector on the top surface of the second projector, and
   the operation portion is provided in a region other than a region covered by the first projector on the top surface.

4. The projection system according to claim 1, wherein
   the outline of the first calibration image and the outline of the second calibration image have a same size and a same shape when formed on light modulators of the first projector and the second projector.

5. The projection system according to claim 4, wherein
   the outline of the first calibration image and the outline of the second calibration image are rectangles.

6. The projection system according to claim 4, wherein
the outline of the first calibration image and the outline of the second calibration image have different colors from one another.

7. The projection system according to claim 1, wherein
the control unit of the one projector of the first projector and the second projector further applies distortion correction to the first calibration image or the second calibration image based on the captured image such that the outline of the first calibration image overlaps the outline of the second calibration image after the distortion correction.

8. A support comprising:
a first supporting member to which a first projector is fixed;
a second supporting member to which a second projector is fixed;
a moving mechanism configured to connect the first supporting member and the second supporting member and relatively move the first supporting member and the second supporting member, and
an attachment screw provided on the moving mechanism, wherein
the moving mechanism locates the first projector in a first position where the first projector covers at least a part of a top surface of the second projector or a second position where the first projector uncovers the top surface of the second projector,
the moving mechanism relatively rotates the first supporting member and the second supporting member around a predetermined rotation axis and locates the first projector in the first position or the second position,
the first supporting member and the second supporting member are rotatably connected at the rotation axis,
the rotation axis is orthogonal to a direction extending along a projecting direction of the image by the first projector or the second projector and a direction extending along a thickness direction of the first projector or the second projector,
the attachment screw is provided on the rotation axis and includes:
a shaft portion, in an outer circumference of which a screw groove is formed, and
a head portion provided on one end side of the shaft portion,
the first supporting member includes a first connecting portion,
the second supporting member includes a second connecting portion,
the first connecting portion includes an attachment hole into which the attachment screw is screwed,
the second connecting portion includes an insert hole provided into which the attachment screw is inserted,
the second connecting portion is held between the first connecting portion and the head portion through the insertion of the attachment screw into the insert hole and the attachment hole, and
the attachment screw further includes a fitting portion provided between the shaft portion and the head portion and fitting in the insert hole.

9. The support according to claim 8, wherein
the rotation axis is provided at a direction perpendicular to the projecting direction with respect to the first projector or the second projector, and
the rotation axis is provided on an opposite side to a side from which the image is projected from the first projector or the second projector.

10. The support according to claim 8, further comprising:
a rotation suppressing mechanism configured to suppress the relative rotation of the first supporting member and the second supporting member,
wherein the rotation suppressing mechanism includes an urging member and maintains the first projector to be located in the second position with an urging force of the urging member.

11. The support according to claim 10, wherein
the rotation suppressing mechanism further includes a contact portion configured to contact with the urging member according to the relative rotation of the first supporting member and the second supporting member,
the urging member is provided in one of the first supporting member and the second supporting member, and
the contact portion is provided in the other of the first supporting member and the second supporting member and has a shape in which a distance between the rotation axis and a position where the contact portion and the urging member are in contact increases according to the relative rotation from the first position to the second position.

12. The support according to claim 8, wherein
the first supporting member includes a first fixing portion to which a first projector is fixed, the first connecting portion being connected to the first fixing portion,
the second supporting member includes a second fixing portion to which a second projector is fixed, the second connecting portion being connected to the second fixing portion,
the second connecting portion includes a slit extending from an outer edge toward an inner side and the insert hole provided to communicate with the slit and into which the attachment screw is inserted, and
the attachment screw includes a taper portion provided between the shaft portion and the head portion and having a cross-sectional area which increases from the shaft portion toward the head portion.

13. The support according to claim 12, wherein
the insert hole has a shape, a part of which protrudes to an outer side of an imaginary region formed by imaginarily extending edge portions of the slit along a direction in which the slit extends, when the insert hole and the slit are seen in plan view.

14. The support according to claim 13, wherein
the insert hole has a shape in which a tangential line of the insert hole coincides with any one of edge portions of the slit or an imaginary line formed by imaginarily extending the edge portion.

15. The support according to claim 13, wherein
the first connecting portion and the second connecting portion are formed to extend along a vertical direction,
the slit has a shape inclining to a downward side from the outer edge of the second connecting portion in a posture in which top surfaces of the first projector and the second projector respectively fixed to the first fixing portion and the second fixing portion are located on an upward side with respect to bottom surfaces of the first projector and the second projector, and
the insert hole has a shape protruding to the upward side of the imaginary region in the posture.

16. A projection system comprising:
a first projector;
a second projector; and
the support according to claim 8.

17. An image display method used in a projection system including a first projector and a second projector supported by a support in positions where projection distances from the first projector and the second projector to a projection surface are different, comprising:

superimposing an image projected on the projection surface from one projector, the projection distance of which is long, of the first projector and the second projector with reference to an image projected on the projection surface from another projector of the first projector and the second projector, the projection distance of which is short; and adjusting the image projected on the projection surface from the one projector, the projection distance of which is long, of the first projector and the second projector with reference to the image projected on the projection surface from the another projector, the projection distance of which is short, wherein the adjusting of the image projected on the projection surface includes:

projecting a first calibration image from the first projector and projecting a second calibration image from the second projector, the first calibration image and the second calibration image each including an image of an outline, capturing an image of the first calibration image and the second calibration image projected on the projection surface, and applying size correction to the first calibration image or the second calibration image based on the captured image to compensate for different projection distances of the first projector and the second projector such that the outline of the first calibration image overlaps the outline of the second calibration image after the size correction.

* * * * *